United States Patent
Holden et al.

(10) Patent No.: US 6,524,747 B2
(45) Date of Patent: Feb. 25, 2003

(54) CATALYST EQUIPPED VAPOR-COMMUNICATING MULTI-CELL VALVE REGULATED LEAD-ACID BATTERY

(75) Inventors: Leslie S. Holden, Blue Bell, PA (US); Sudhan S. Misra, North Wales, PA (US); Terrence M. Noveske, Pipersville, PA (US)

(73) Assignee: C&D Charter Holdings, Inc., Wilmington, DE (US)

( * ) Notice: Subject to any disclaimer, the term of this patent is extended or adjusted under 35 U.S.C. 154(b) by 0 days.

(21) Appl. No.: 09/999,871

(22) Filed: Oct. 19, 2001

(65) Prior Publication Data

US 2002/0061434 A1 May 23, 2002

Related U.S. Application Data

(60) Division of application No. 09/334,101, filed on Jun. 16, 1999, now Pat. No. 6,432,582, which is a continuation-in-part of application No. 09/257,432, filed on Feb. 25, 1999, now abandoned, which is a continuation-in-part of application No. 09/212,225, filed on Dec. 16, 1998, now abandoned.
(60) Provisional application No. 60/089,550, filed on Jun. 17, 1998.

(51) Int. Cl.[7] ............................................. H01M 4/56
(52) U.S. Cl. ............................................. 429/225; 429/176
(58) Field of Search .................... 429/48, 57, 58, 429/82, 84, 86, 175, 176, 225

(56) References Cited

U.S. PATENT DOCUMENTS

| | | |
|---|---|---|
| 1,527,426 A | 2/1925 | Cook |
| 1,920,261 A | 8/1933 | Lavender |
| 2,480,861 A | 9/1949 | Jaworski et al. |
| 2,516,084 A | 7/1950 | Wells |
| 2,894,524 A | 7/1959 | Gill |
| 3,440,109 A | 4/1969 | Plattner |
| 3,840,403 A | 10/1974 | George |
| 3,944,437 A | 3/1976 | Auerbach |
| 4,007,315 A | 2/1977 | Brinkmann et al. |
| 4,053,683 A | 10/1977 | Rounds |
| 4,068,043 A | 1/1978 | Carr |
| 4,160,068 A | 7/1979 | Kummer |
| 4,246,324 A | 1/1981 | de Nora et al. |
| 4,374,907 A | 2/1983 | Chuang et al. |
| 4,383,011 A | 5/1983 | McClelland |
| 4,521,498 A | 6/1985 | Juergens |

(List continued on next page.)

FOREIGN PATENT DOCUMENTS

| | | |
|---|---|---|
| DE | 29 04 842 | 8/1980 |
| FR | 1571749 | 6/1969 |
| JP | 356168366 A | 12/1981 |
| JP | 361188855 A | 8/1986 |
| JP | 362115652 A | 5/1987 |
| JP | 362115653 A | 5/1987 |
| JP | 362115654 A | 5/1987 |
| JP | 401248456 A | 10/1989 |
| JP | 402037663 A | 2/1990 |
| WO | WO 97/15958 | 5/1997 |
| WO | WO 98/21766 | 5/1998 |

OTHER PUBLICATIONS

David Linden, Handbook of Batteries, Second Edition, McGraw–Hill, Inc., New York, 1995, p. 23.7.

Copy of application Ser. No. 09/212,225, filed on Dec. 16, 1998, entitled "Lead–Acid Battery Vent Valve–Catalyst Carrier Assembly".

*Primary Examiner*—M. Alexandra Elve
*Assistant Examiner*—Jonathan Johnson
(74) *Attorney, Agent, or Firm*—Hoffman & Baron, LLP

(57) ABSTRACT

A recombinant lead-acid battery comprising a plurality of lead-acid cells in a case including apertured partitions defining space for vapor migration among cells and comprising a catalyst unit communicating with said vapor migration space and enhancing recombination of hydrogen and oxygen.

16 Claims, 11 Drawing Sheets

U.S. PATENT DOCUMENTS

| | | |
|---|---|---|
| 4,606,982 A | 8/1986 | Nelson et al. |
| 4,637,966 A | 1/1987 | Uba et al. |
| 4,650,729 A | 3/1987 | Kummer |
| 4,769,299 A | 9/1988 | Nelson |
| 4,871,428 A | 10/1989 | Misra et al. |
| 5,055,656 A | 10/1991 | Farah et al. |
| 5,068,160 A | 11/1991 | Clough et al. |
| 5,182,178 A | 1/1993 | Brizendine et al. |
| 5,185,221 A | 2/1993 | Rampel |
| 5,290,640 A | 3/1994 | Tsenter |
| 5,682,671 A | 11/1997 | Lund et al. |
| 5,695,888 A | 12/1997 | Gage |
| 5,768,906 A | 6/1998 | Tsenter |
| 5,981,099 A | 11/1999 | Bourbeau |
| 6,051,332 A | 4/2000 | Verhoog et al. |
| 6,274,263 B1 | 8/2001 | Jones |

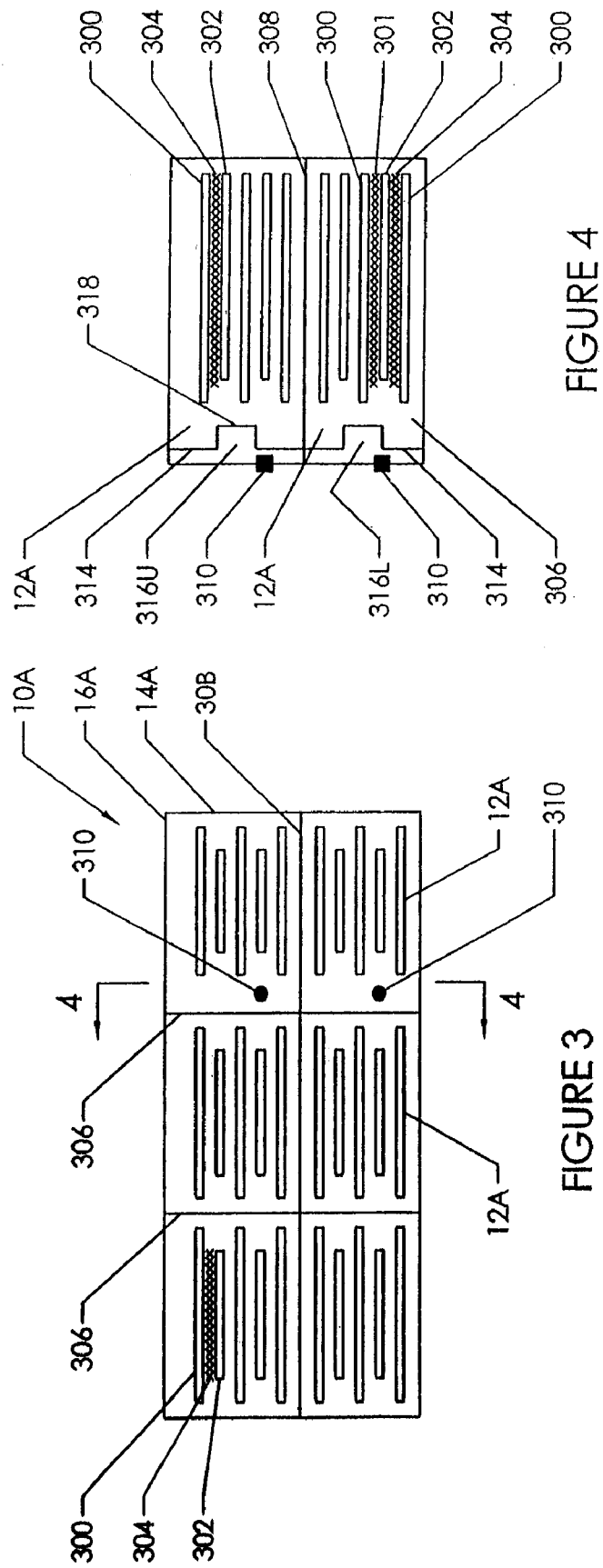

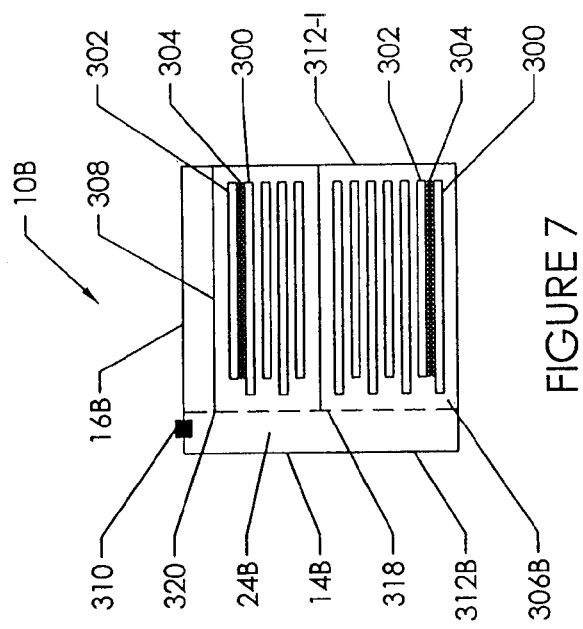
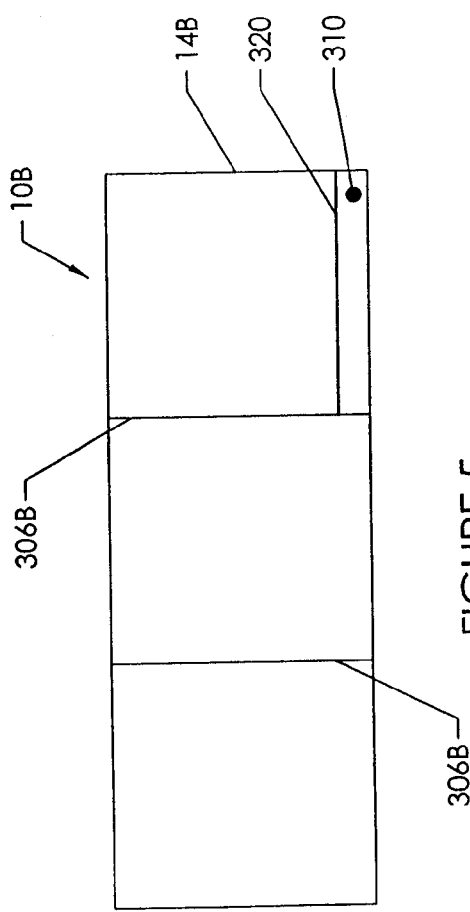
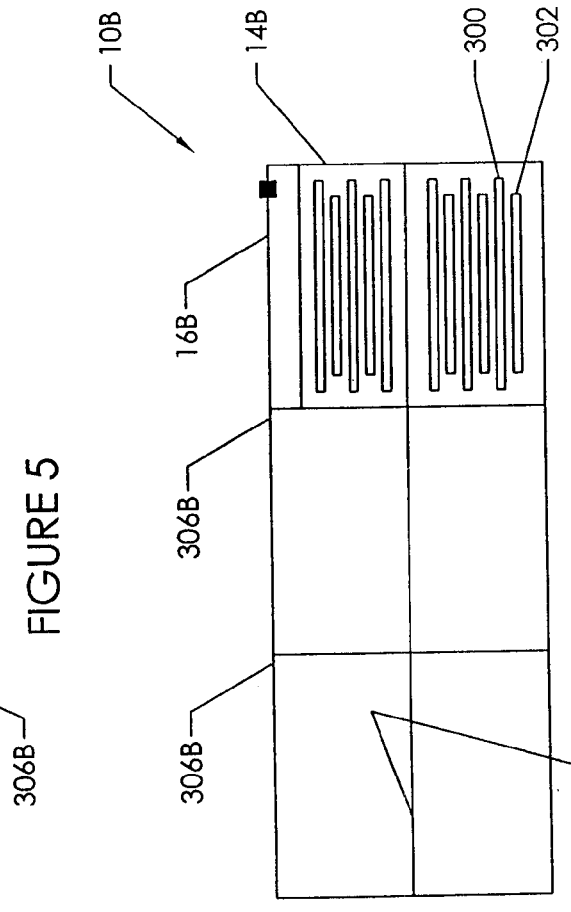

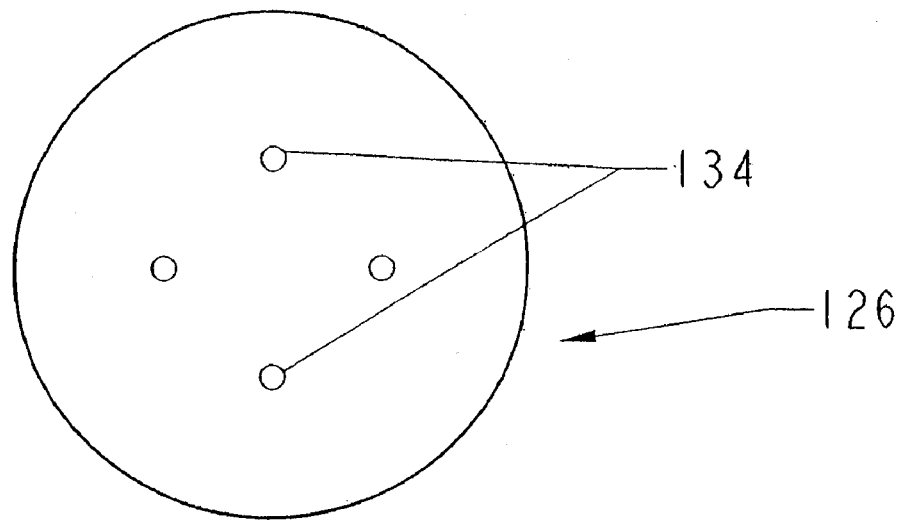
FIGURE B
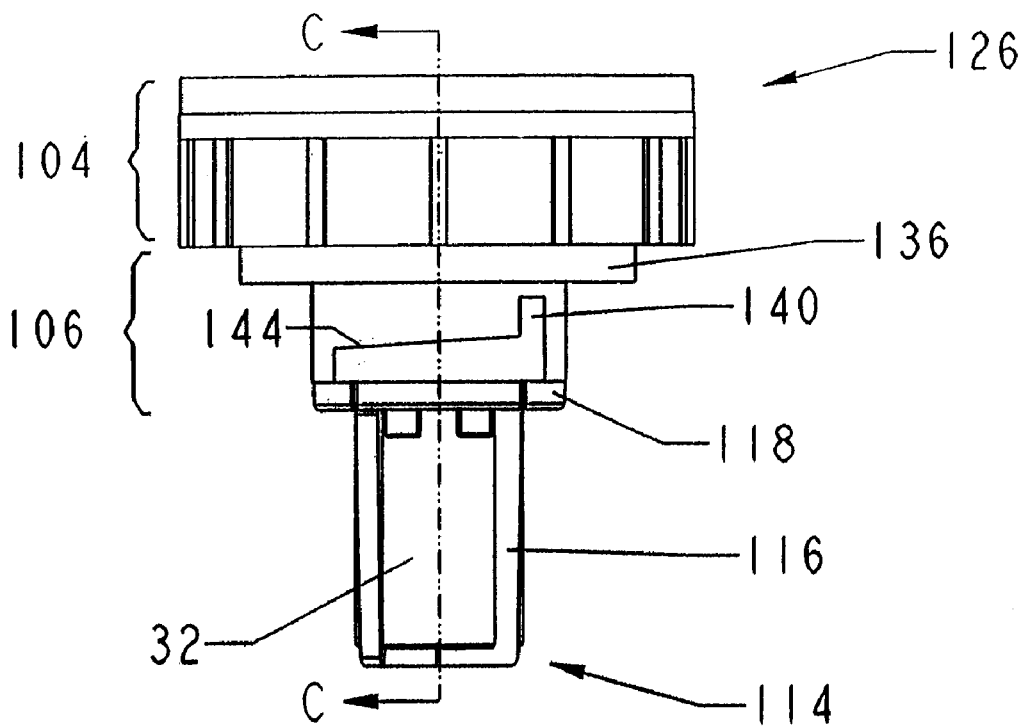
FIGURE A

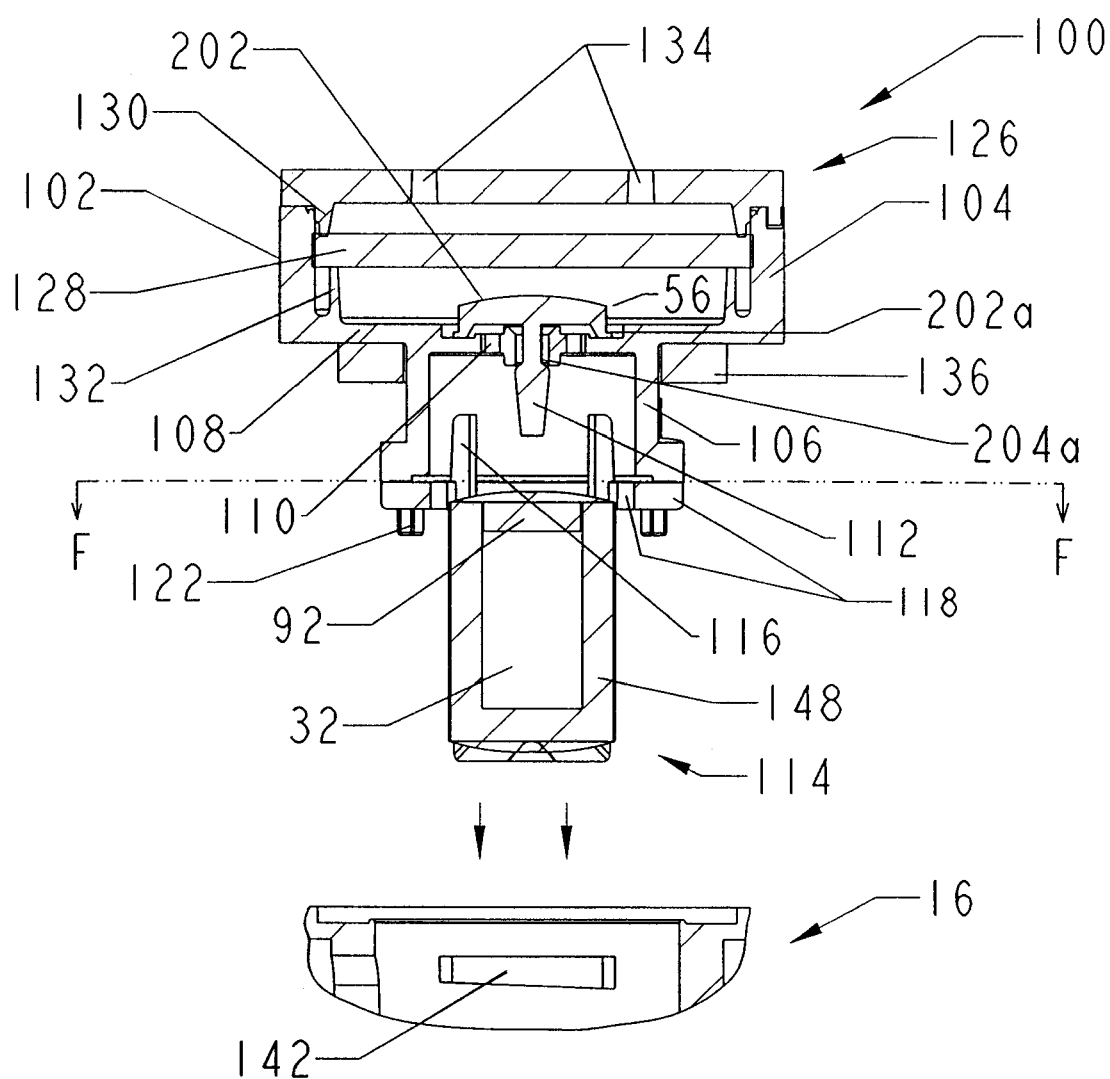
FIGURE C

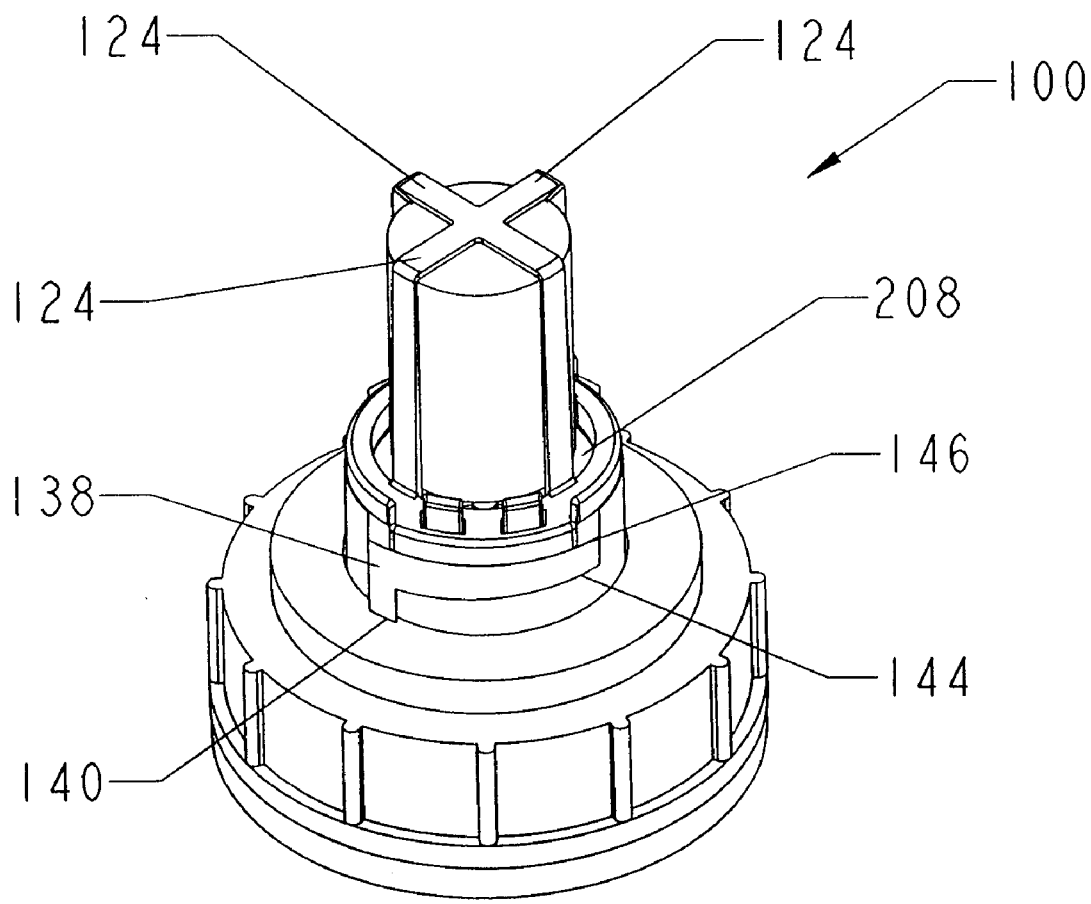
FIGURE D

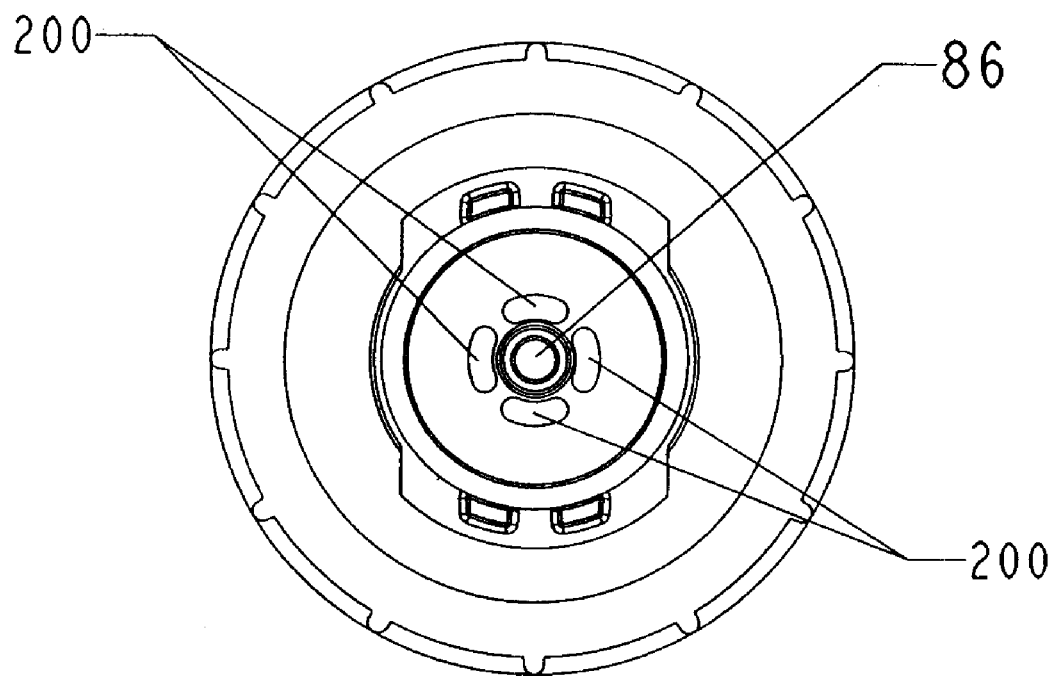
FIGURE E

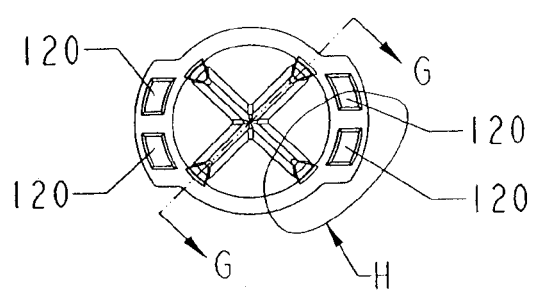
FIGURE F
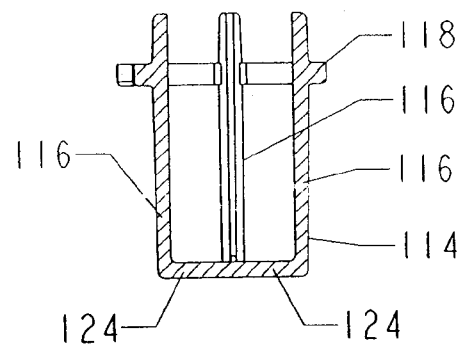
FIGURE G
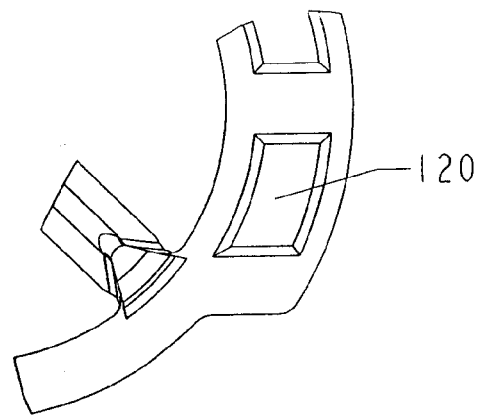
FIGURE H

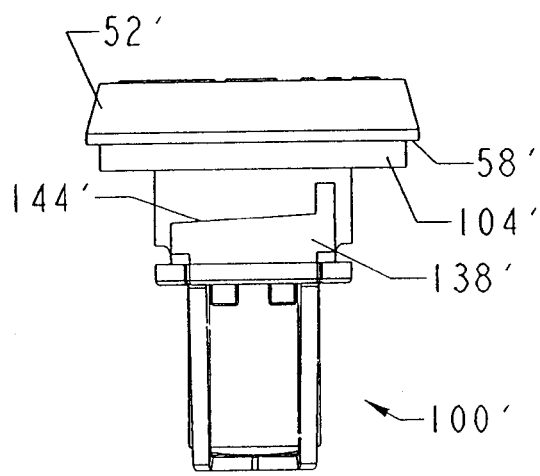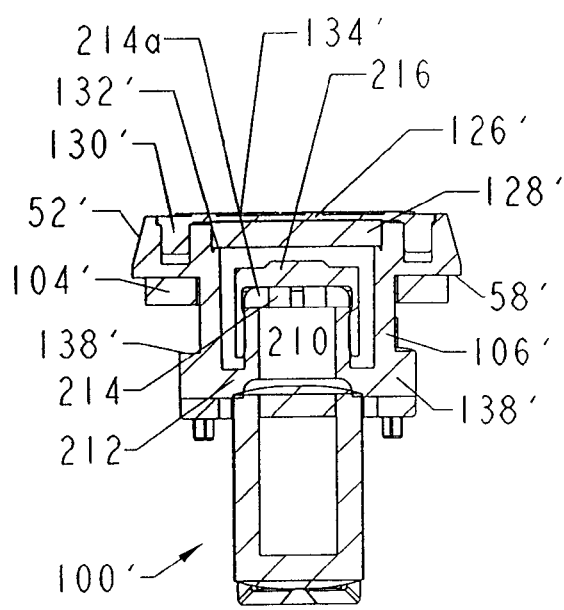
FIGURE I            FIGURE J

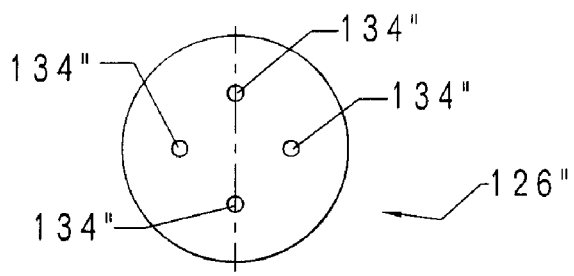
FIGURE M
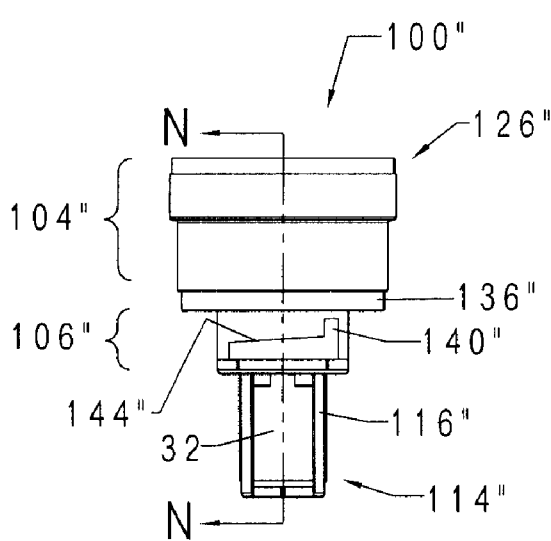
FIGURE K
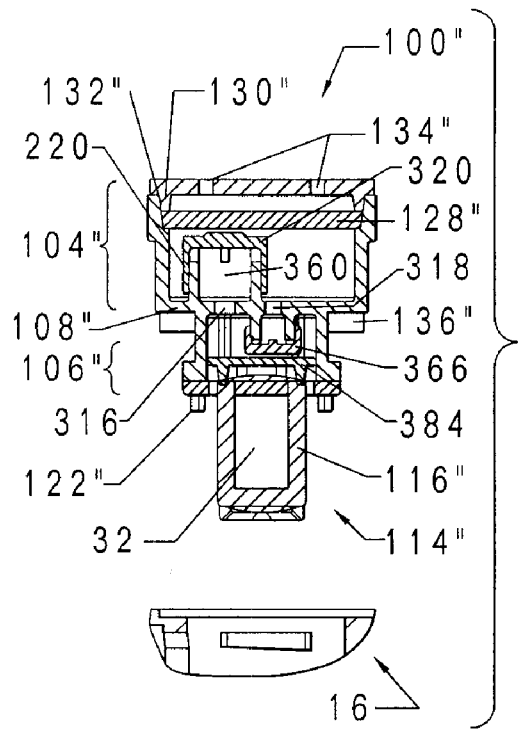
FIGURE N
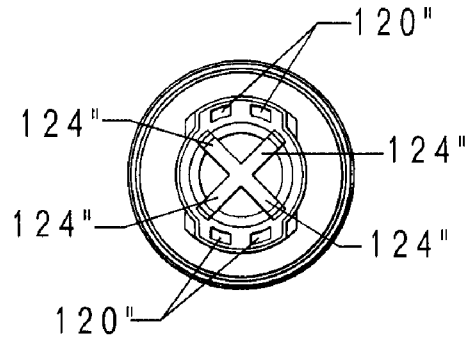
FIGURE L

CATALYST EQUIPPED VAPOR-COMMUNICATING MULTI-CELL VALVE REGULATED LEAD-ACID BATTERY

CROSS-REFERENCE TO RELATED APPLICATIONS

This application is a divisional of U.S. Ser. No. 09/334,101, filed on Jun. 16, 1999, now U.S. Pat. No. 6,432,582 which is a continuation-in-part of U.S. Ser. No. 09/257,432, filed on Feb. 25, 1999, now abandoned and which is a continuation-in-part of Ser. No. 09/212,225, now abandoned filed on Dec. 16, 1998, and which claims priority on U.S. Provisional Patent Application No. 60/089,550, filed Jun. 17, 1998.

DESCRIPTION OF THE PRIOR ART

Lead-acid batteries are known and have achieved wide acceptance in a variety of fields.

Valve-regulated lead-acid batteries, particularly so-called absorbent glass mat or "AGM" valve-regulated lead-acid batteries have achieved significant acceptance in recent years as sources of standby electrical power. These absorbent glass mat valve-regulated lead-acid batteries have become widely used to provide standby power for telecommunications applications, typically for cellular telephone towers, other telecommunications equipment and computers. In such applications, the absorbent glass mat valve-regulated lead-acid batteries are maintained on a standby basis; power is drawn from these absorbent glass mat valve-regulated lead-acid batteries only when the primary source of power to the cellular telephone towers, other telecommunications equipment or computer is interrupted, such as during a failure of a public utility power grid. In such instance, the absorbent glass mat valve-regulated lead-acid batteries, which may have been on standby for a number of years, supply power until the primary source of power, typically the public utility grid, has returned to service.

Gas recombination catalysts have been used in flooded lead-acid batteries as well as in other battery systems. These catalysts have been positioned externally to the battery cells contacting the open atmosphere. The catalysts recombine oxygen and hydrogen gas on their surfaces, converting the gas back into water vapor which condenses and flows back into the battery. Such catalysts have found limited application in standby batteries and have not been used heretofore for valve-regulated lead-acid batteries due to the need for compact, space efficient installation which is inconsistent with having an external catalyst unit.

Valve-regulated lead-acid batteries designed for standby service typically are electrolyte-limited, having the entire electrolyte absorbed in microfibrous glass mat material serving as the separator between the positive and negative plates. Any water loss from the battery reduces total water volume available and increases concentration and specific gravity of the sulfuric acid electrolyte. Loss of liquid volume can lead to partial loss of contact between the absorbent glass mat separator and the active plates within the battery, resulting in premature performance degradation.

It has been found that absorbent glass mat valve-regulated lead-acid batteries in standby, back-up power service, tend to lose capacity over time, even if a small trickle charge of current is applied automatically to the battery. It has also been found that catalysts, notably palladium, when positioned in intimate contact with vapor phase electrolyte in an absorbent glass mat valve-regulated lead-acid battery, tend to stem such capacity losses by enhancing the reaction by which hydrogen and oxygen recombine into water within the cell; it is this recombination reaction which gives such cells their "recombinant" name. Reduction in loss of capacity and consequent greater confidence in the ability of such cells to provide standby power over a long term, such as for twenty years, has been attributed to the catalyst recombination of hydrogen and oxygen into water and thereby reducing loss of hydrogen and oxygen gas with the attendant loss of potential for generation of water from the cell.

SUMMARY OF THE INVENTION

This invention is based on the surprising and unexpected discovery that multiple cells in a standby service valve regulated recombinant lead-acid battery placed in vapor communication one with another may be served by a number of catalyst units fewer than the number of cells with excellent performance. Such batteries exhibit substantially better gassing rates than conventional non-catalyst equipped batteries with conventional (non-vapor communicating) cells and have significant manufacturing advantages.

The catalyst units are desirably associated with vent valve housings, positioned just below the pressure relief vent. As a result, gas trying to escape from head space via which multiple cells vapor communicate one with another is in proximity with the catalyst unit.

Surprisingly, in such batteries even in standby service, there is sufficient mass transfer among vapor-communicating cells that oxygen and hydrogen gas produced by the electrolytic reaction recombine under the effect of the catalyst even though the catalyst is not in immediate proximity with some of the vapor-communicating cells. When batteries embodying the invention are on float, there is a considerable decrease in gas escaping when a catalyst is provided in a common head space, reducing and in some cases effectively eliminating water loss. Additionally, decreases in float current have been observed in batteries embodying the invention vis-a-vis comparable non-catalyst equipped commercially available batteries. Moreover, there is an improvement in retention of electrical performance in batteries embodying the invention vis-a-vis comparable commercially available batteries without the catalyst. Water vapor produced through the electrolytic reaction apparently does not concentrate in the vicinity of the catalyst but distributes itself throughout common head space shared by multiple vapor-communicating cells.

In one of its aspects this invention provides a recombinant lead-acid battery including a case, a plurality of lead-acid cells within the case, where each cell includes a plurality of positive and negative lead metal plates, and absorbent separator material between at least some of the positive and negative plates. In this aspect of the invention, the case preferably includes partitions for separating adjacent cells one from another with portions of the partitions being spaced from the proximate portion of the case to define space for mass transfer vapor migration and partial pressure equalization among the cells within the case. At least one catalyst unit is preferably connected to the case and communicates with the mass transfer vapor migration and partial pressure equalization space to enhance recombination of hydrogen and oxygen into water within the battery.

The catalyst unit is preferably constructed together with a vent valve for the battery so as to be removable from the battery unitarily with the vent valve for ease of maintenance and manufacture. The catalyst material preferably sits in a cage connected to a lower portion of the vent valve so that upon insertion of the vent valve into the battery case, the catalyst material enters the vapor communication space via which mass transfer vapor migration and partial pressure equalization occurs among a plurality of cells within the battery.

The catalyst unit is desirably at least partially within the battery case and is most preferably essentially if not totally within the battery case. The catalyst is preferably palladium or a palladium alloy, most preferably 0.5 percent (0.5%) palladium deposited on alumina or carbon. Other suitable catalysts include platinum, ruthenium, rhodium, other metals of the platinum group, precious metals, other noble metals and compounds such as tungsten carbide. While the preferred loading of the catalyst on the substrate is 0.5 percent (0.5%), 0.8 percent (0.8%) also works well and loadings of one percent (1%) or less are the preferred range. However, catalyst loadings may be as high as ten percent (10%) by weight of the substrate.

In another of its aspects, this invention provides a recombinant lead-acid battery which includes a case and a plurality of lead-acid cells within the case where each cell includes positive and negative lead metal plates and absorbent separator material between some of the positive and negative plates. Some or all of the cells within the case are in vapor mass transfer and partial pressure equalization communication one with another. A plurality of catalyst units are in vapor communication with the cells and enhance recombination of hydrogen and oxygen into water within the battery, with the plurality of catalyst units preferably being fewer in number than the plurality of lead-acid cells. Preferably at least some of the catalyst units are at least partially within the battery case and most preferably at least some of the catalyst units are completely within the battery case. The catalyst units are preferably constructed to be essentially integral with a vent valve for the battery which is removable from and replaceable in the battery case. Most preferably, the vent valve/catalyst unit combination fits into the top of the battery case, at a position at which gasses evolving during the electrolytic reaction would collect.

In yet another of its aspects, this invention provides a method for operating a recombinant lead-acid battery having a case, a plurality of lead-acid cells within the case, with each cell including positive and negative lead metal plates, and absorbent separator material between at least some of the positive and negative plates, where the method comprises placing at least some of the cells into vapor communication one with another and placing a plurality of discrete catalyst units fewer in number than the vapor communicating cells into vapor communication with the cells to enhance recombination of hydrogen and oxygen into vapor phase water within the battery.

In another of its aspects, this invention provides a pancake-style recombinant lead-acid battery having a case with vertically stacked pluralities of lead-acid cells within the case. Each cell preferably comprises a plurality of horizontal positive and negative lead metal plates and absorbent separator material between at least some of the positive and negative plates. Pluralities of-cells are in vapor communication one with another. The battery further includes catalyst units connected to the case and communicating with spaces via which cells of respective pluralities vapor communicate one with another, for enhancing combination of hydrogen and oxygen within the battery. The number of catalyst units is preferably less than the plurality of cells. Respective catalyst units are preferably provided connected to the case and communicating with respective cell vapor communication spaces on a one-to-one basis. The pancake-style recombinant lead-acid battery manifesting aspects of the invention may include terminals, for connecting the battery to a load, which exit from a vertical external surface of the case or from a horizontal external surface of the case. In the pancake configuration, one or more common head spaces may be provided at the top of the battery with suitable passageways provided for communication therewith by the pancaked plates and separators. In another configuration of the pancake-style recombinant battery, the catalyst units and, optionally, a vent-valve plug constructed integrally therewith, may be provided at the side of the battery with suitable internal configurations permitting vapor communication from the plates to the catalyst unit/vent plug combinations.

The battery preferably further includes partitions within the case for separating adjacent cells one from another with portions of the partitions being spaced from the case to define the cell vapor communication space.

The partitions preferably include vertical and horizontal partitions with some of the partitions being spaced from the case interior to define the cell vapor communication space. The horizontal partitions may block vapor communication between vertically stacked cells in the pancake-style recombinant lead-acid battery manifesting aspects of the invention.

In yet another of its aspects, this invention embraces a lead-acid battery having a case comprising a jar and a cover and a plurality of lead-acid cells within the jar. Each cell preferably includes a plurality of upstanding positive and negative lead metal plates and absorbent separator materials between at least some of the positive and negative plates. The jar preferably includes upstanding partitions for separating adjacent cells one from another with upper portions of the partitions being spaced from the cover to define space for vapor migration among cells. A catalyst unit is preferably connected to the case and communicates with the vapor migration space to enhance recombination of hydrogen and oxygen into water in at least partially vapor phase within the battery.

In this aspect of the invention, plates of a given plurality of respective cells may having upstanding terminal tab portions extending above the upper portions of the partitions. In such case, the battery may further include electrically conductive members connectively extending between the terminal tab portions of plates of like plurality of adjacent cells. The electrically conductive members are preferably lead-metal strips and are preferably welded to respective terminal tab portions.

As a variation, the jar may have upstanding partition portions for separating adjacent cells one from another and the cover may include downwardly extending partition portions aligned with the upstanding partition portions to define partitions which, with walls of the case, form compartments for the cells. The partitions may have apertures therethrough for vapor communication among cells in respective compartments. Upper portions of the plates may be spaced from the cover to define space for vapor residence. At least one catalyst unit is preferably connected to the case and communicates with a vapor residence space for enhancing recombination of hydrogen and oxygen into water within the battery. The number of catalyst units are preferably less than the plurality of cells.

In yet another variation, portions of the partitions which are spaced from the cover may be aligned and form the upper parts of the partitions proximate to the cover. The spaced portions may be cutouts formed in upper parts of the partitions proximate to the cover and may be longitudinally aligned. The cutouts may be rectangular and may be formed in upper edges of the partitions. The cutouts are preferably completely above the plates of the cells but may be only partially above the plates of the cells.

DESCRIPTION OF THE DRAWINGS

FIG. 3 is a schematic front elevation of a catalyst-equipped vapor-communicating multi-cell lead-acid pancake style recombinant battery having catalyst units mounted on the side of the battery, in accordance with the invention.

FIG. 4 is a schematic end view of the catalyst-equipped vapor-communicating multi-cell lead-acid pancake style recombinant battery illustrated in FIG. 3.

FIG. 5 is a schematic top view of a catalyst-equipped vapor-communicating multi-cell lead-acid pancake style recombinant battery having the catalyst unit mounted at the top of the battery, in accordance with the invention.

FIG. 6 is a schematic front elevation of the catalyst-equipped vapor-communicating multi-cell lead-acid pancake style recombinant battery illustrated in FIG. 5.

FIG. 7 is a schematic end elevation of the catalyst-equipped vapor-communicating multi-cell lead-acid pancake style recombinant battery illustrated in FIGS. 5 and 6.

FIG. A is a side elevation of a battery vent valve-catalyst carrier assembly for use in practicing the invention.

FIG. B is a top view of the structure of FIG. A.

FIG. C is an enlarged sectional view, taken along line C—C of FIG. A of a battery vent valve-catalyst cover assembly, together with a partial sectional view of a vent valve-catalyst carrier assembly of a battery case.

FIG. D is an inverted perspective view of the vent valve-catalyst carrier assembly illustrated in FIGS. A through C.

FIG. E is a bottom view of the structure of FIG. D, with the catalyst carrier and supporting structure removed, looking in the direction opposite that of arrows F—F in FIG. C.

FIG. F is an enlarged top view of the catalyst carrier and support structure separated from the battery vent valve assembly of FIGS. A through E, looking in the direction of arrows F—F in FIG. C.

FIG. G is a sectional view taken along lines G—G in FIG. F.

FIG. H is an enlarged partial view of the structure shown within dot and dash line H—H in the lower right portion of FIG. F.

FIG. I is a side elevation of another vent valve-catalyst carrier assembly which is a modification of the structure illustrated in FIGS. A through H.

FIG. J is an axial vertical section of the structure of FIG. I.

FIG. K is a side elevational view of another battery vent valve-catalyst carrier assembly for use in practicing the invention.

FIG. L is a bottom view of the structure of FIG. K.

FIG. M is a top view of the structure of FIGS. K and L.

FIG. N is a sectional view taken along line N—N of FIG. K, of the battery vent valve-catalyst carrier assembly together with a broken sectional view of a portion of a battery cover.

DESCRIPTION OF THE PREFERRED EMBODIMENTS AND BEST MODE KNOWN FOR PRACTICING THE INVENTION

Figure 1:
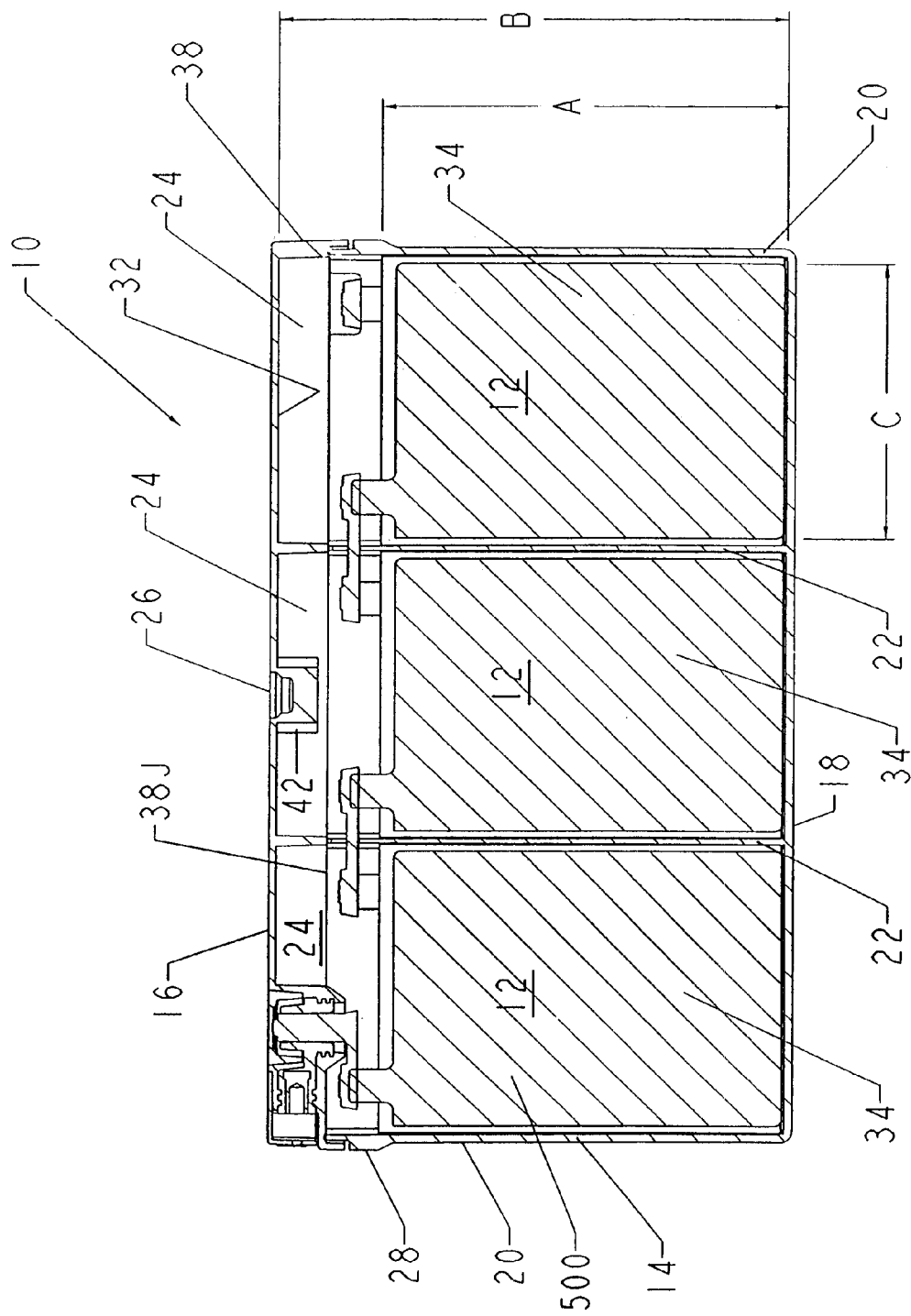
FIG. 1 is a schematic front elevation in section of a catalyst-equipped vapor-communicating multi-cell lead-acid vertical plate recombinant battery in accordance with the invention.

Referring to the drawings in general and to FIG. 1 in particular, a battery 10 is depicted schematically in vertical section. Battery 10 is housed within and includes a case 28 having a jar or body portion 14 and a cover 16 fitting on the top of jar 14. Cover 16 is preferably equipped with a lip fitting over an upstanding exterior surface of jar 14 in the region of jar-cover juncture. The lip is designated 38 in FIG. 1.

The vertical extremity of jar 14 preferably fits within a groove formed in a downwardly facing surface of cover 16. This "tongue in groove" construction is visible adjacent to lip 38 in FIG. 1, but the construction has not been numbered, to aid drawing clarity. The flat, horizontal bottom portion of jar 14 is designated 18; vertically upstanding sides of jar 14 are designated 20. Jar 14 preferably has a plurality of internal vertically upstanding partitions 22 defining, together with jar sides 20 and jar bottom 18, cell compartments 12 within which recombinant lead-acid electrical cells, shown schematically and designated generally 34, reside. Juncture of jar 14 and cover 16 in the battery interior has been depicted by a line 38J; jar-cover juncture line 38J has not been illustrated in the central one of cell compartments 12 in FIG. 1 to enhance drawing clarity and visualization of the head space.

Each cell compartment 12 preferably housings a single electro-chemical cell where the cell preferably includes a plurality of positive lead metal plates, a plurality of negative lead metal plates and, preferably, absorbent glass mat separator material between the positive and negative plates. The absorbent glass mat separator material absorbs sulfuric acid electrolyte solution thereby maintaining electrolyte in contact with the surfaces of the preferably alternating, interleaved positive and negative lead metal plates. The plates are preferably connected in parallel to provide a single lead-acid cell having a nominal voltage of 2.26 volts.

The lead metal plates are depicted schematically in FIG. 1 and designated generally 500; the absorbent glass mat separator material is not depicted in FIG. 1.

Cells in respective compartments 12 are preferably connected in series one with another thereby to provide a desired output of 6 or 12 volts from battery 10. In the configuration illustrated schematically in FIG. 1, with three cells connected together in series, the battery would have a nominal output voltage slightly above 6 volts. Different numbers and combinations of cells and cell connections can be used to effectuate desired battery voltage and current output levels.

Figure 2:
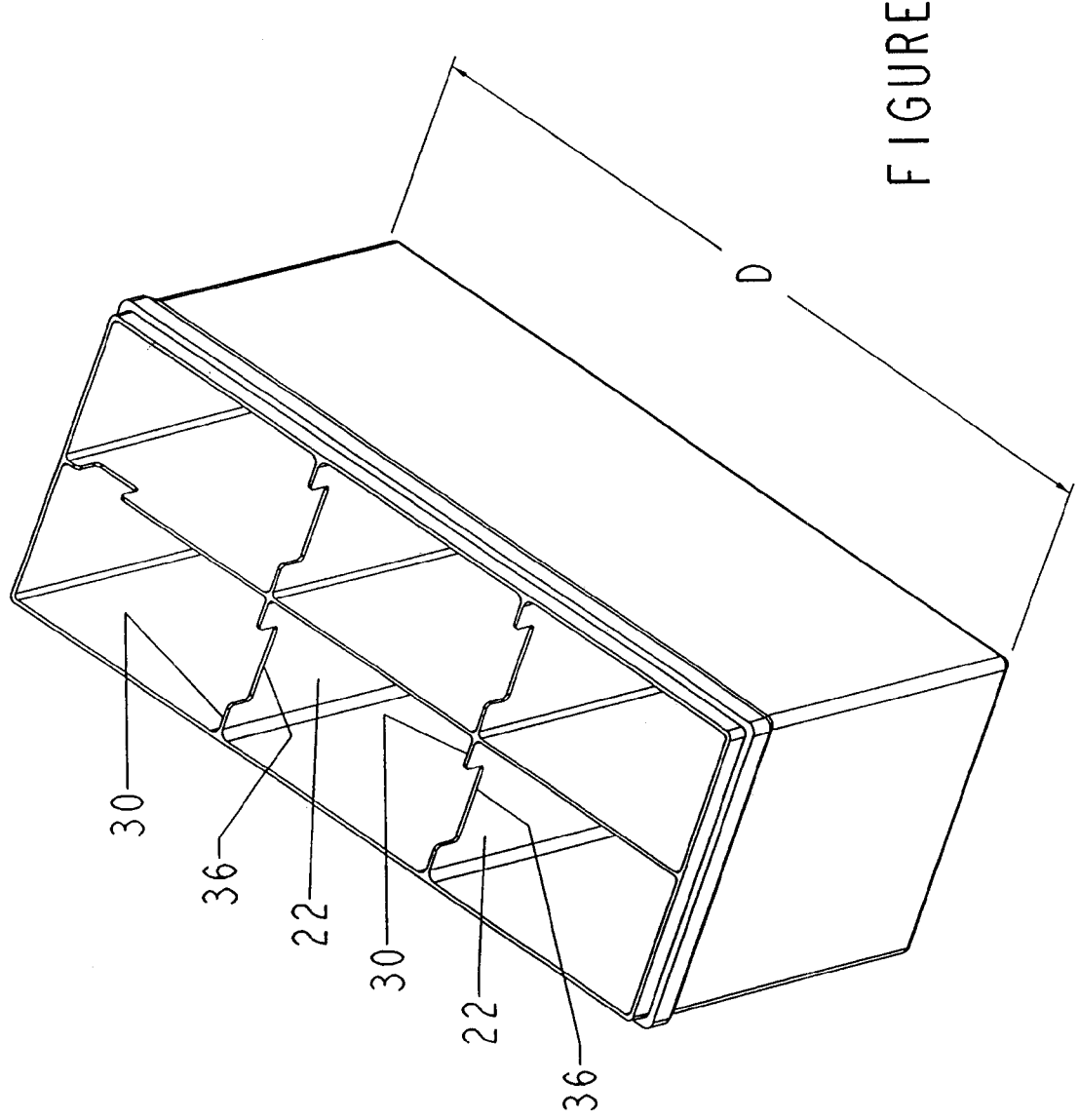
FIG. 2 is an isometric view of a jar for a catalyst-equipped vapor-communicating multi-cell recombinant lead-acid battery of the type illustrated in FIG. 1.

Referring to FIG. 2, jar internal partitions 22 preferably include notch portions at their upper extremities, resulting in partitions 22 having portions which are vertically shortened, stopping short of jar cover 16. The un-notched upper extremity portions of jar internal partitions 22 are designated 30 in FIG. 2 and the upper extremities of the notched portions of partitions 22 are designated 36 in FIG. 2.

Spacing of upper extremities 36 of the notched portions of jar internal partitions 22 away from a lower surface 32 of cover 16, together with appropriate sizing and dimensioning of the lead metal plates and separators fitting within cell compartments 12, provides a head space 24 within jar 14 above each of cells 34. Presence of head spaces 24, with apertures such as notches 36 providing vapor transfer passageways between and among individual cells, permits direct vapor mass transfer and partial pressure equalization among two or more communicating cells 34.

A catalyst unit, such as one of the combination vent valve-catalyst carrier assemblies 100 illustrated in FIGS. A through N, fits within catalyst unit receptacle 26 formed in cover 16 and illustrated in FIG. 1 and communicates with a head space 24 via which two or more cells are in vapor communication. As a result, hydrogen and oxygen, which evolve from the lead metal plates as the electrochemical reaction proceeds, come into vapor communication with one another and with catalyst material within the catalyst unit and recombine into water or water vapor. The catalyst unit residing in receptacle 26 has a catalyst material, preferably palladium, therein and exposes the evolved hydrogen and oxygen within battery 10 resulting from the electrochemical reaction to the catalyst material within catalyst unit 26. This enhances recombination of the hydrogen and oxygen into water or water vapor within battery 10.

In the preferred practice of the invention substantially no liquid phase water results from the recombination of hydrogen and oxygen in the presence of the catalyst. This is believed to be due to the high heat of reaction of the recombination process in the presence of the catalyst. The hydrogen and oxygen, when recombining, go directly to vapor phase water, i.e. steam, with the reaction occurring at a temperature in the neighborhood of 400° Fahrenheit.

Water vapor resulting from the recombination of the hydrogen and oxygen initially creates a somewhat higher partial pressure of water vapor in the vicinity of the catalyst unit residing in receptacle 26 and communicating with head space 24.

Pressure always seeks to equalize itself within battery 10; as the partial pressure of water equalizes within a given group of vapor-communicating cells 34 within battery 10, the water vapor resulting from the recombination of hydrogen and oxygen distributes itself evenly throughout a given multiplicity of vapor-communicating cells 34 and vapor-communicating cell compartments 12 within battery 10. Additionally contributing to uniformity of conditions within battery 10, those of cells 34 needing water have relatively higher partial pressures of acid and lower partial vapor pressures of water. These conditions encourage water vapor to migrate to those of the vapor-communicating cells which have the most acid and the least water and therefore need water vapor the most.

FIGS. 3 and 4 depict in schematic form a catalyst equipped vapor communicating multi-cell valve regulated lead-acid battery manifesting aspects of the invention in which the lead-metal plates and separators are positioned in horizontal planes. In FIG. 3 the battery having its lead-metal plates in a horizontal, sandwiched configuration is designated generally 10A and includes a jar designated generally 14A and a cover designated generally 16A. Positive and negative lead metal plates are designated generally 300, 302 respectively and are shown in schematic form in both FIG. 3 and FIG. 4. Absorbent glass mat separator material positioned between positive plate 300 and negative plate 302 is designated generally 304 and has been depicted between only some of positive and negative plates 300, 302 in FIGS. 3 and 4, to aid drawing clarity.

In the "pancake" style battery embodying the invention as depicted in FIGS. 3 and 4, the case for the battery consisting of jar 14A and cover 16A may have a plurality of cell compartments, some of which has been designated generally 12A, formed by vertical and horizontal partitions respectively designated 306, 308 in FIGS. 3 and 4.

Two catalyst units are positioned in a vertical side wall 312 of battery 10A. The catalyst units are preferably combination vent valve-catalyst carrier assemblies 100 of one of the types illustrated in FIGS. A through 10.

Horizontal partition 308 divides battery 10A into upper and lower compartments. In the embodiment illustrated in FIGS. 3 and 4, there is no liquid or vapor communication between upper and lower cell compartments since horizontal partition 308 completely separates the upper cell compartments from the lower cell compartments by extending fully between all four vertical side walls of the battery case. The battery case may be fabricated with vertical side wall 312 as the cover and jar 14A forming the remaining five sides of the rectangular solid configuration of battery 10A.

As shown in FIG. 4, vertical partitions 306 have vertically extending edges 314 which are proximate to but spaced from the inner surface of vertical side wall 312 to define horizontally extending upper and lower head spaces designated 316U, 316L respectively. These head spaces extend the longitudinal length of battery 10A where longitudinal is the direction indicated by arrow L in FIG. 3. By virtue of the spacing of vertical edges 314 of vertical partition 306 from the interior surface of vertical side wall 312, upper and lower head spaces 316U, 316L respectively vapor communicate with all of the upper and lower cells 12A of battery 10A.

For manufacturing convenience or to promote vapor communication among the cells, vertical edge 314 of vertical partition 306 may include a notch such as designated 318 in FIG. 4.

As depicted in FIGS. 3 and 4, it is not necessary for a vent valve-catalyst carrier assembly 100 to be positioned symmetrically or even at the centers of respective upper and lower head spaces 316U, 316L. Despite the static, non-dynamic nature of the environment in which batteries embodying the invention are typically maintained and operate, with the absence of significant changes in physical parameters of the environment surrounding the battery over long periods of time, there is nevertheless sufficient mass transfer vapor communication among the vapor communicating cells within the battery that catalyst material in a single vent valve-catalyst carrier assembly 100 effectively serves all of the cells which communicate via a single common head space such as 316U or 316L.

A second pancake configuration battery embodying aspects of the invention is depicted schematically in FIGS. 5, 6 and 7 where the battery is designated generally 10B and includes a jar designated generally 14B and a cover designated generally 16B. In the embodiment illustrated in FIGS. 5, 6 and 7 battery 10B includes positive and negative lead metal plates designated generally 300, 302 respectively and absorbent glass mat separator material between the positive and negative plates 300, 302; the absorbent glass mat separator material has been designated generally 304 and is shown between only some of the lead metal plates to enhance drawing clarity.

Jar 14B illustrated in FIGS. 5, 6 and 7 includes a pair of vertical partitions 306B and a horizontal partition 308B located at the approximate vertical midpoint of jar 14B. As illustrated in FIG. 7, horizontal partition 308B has an edge 318 which is displaced from the interior surface of vertical side wall 312B, where vertical edge 318 has been depicted in dotted lines to enhance drawing clarity. Displacement of vertical edge 318 of vertical partition 306B from the interior surface of vertical side wall 312B creates a common head space 24B extending the vertical height of battery 10B and the longitudinal length of battery 10B. A single vent valve-catalyst carrier assembly 100 is positioned for vapor communication with head space 24B, with vent valve-catalyst carrier assembly 100 being positioned in cover 16B at the upper extremity of head space 24B as illustrated in FIG. 7.

As further illustrated in FIG. 7, jar 14B may include one or more horizontal partitions 308B which desirably extend laterally from side wall 312I towards vertical side wall 312B but stop short thereof, desirably by the same distance vertical edge 318 of vertical partition 306B is separated from vertical side wall 312B. The edge of horizontal partition 308B which is spaced away from vertical side wall 312B is denoted 320 and is best illustrated in FIG. 5. Horizontal partitions 308B may be provided to divide jar 14B into a desired number of cell compartments and may further be provided to strengthen jar 14B. An upper one of horizontal partitions 308B illustrated in FIG. 7 may optionally be provided to effectuate pressure maintenance on plates and separators of a cell and may be spaced from cover 16B in the manner illustrated in FIG. 7. In-battery 10B a single vent valve-catalyst carrier assembly 100 serves all six lead-acid cells of battery 10B.

Referring to FIGS. A through H, a vent valve-catalyst carrier assembly suitable for installation in a multi-cell common head space recombinant valve regulated lead-acid battery practicing the invention is designated generally 100.

Vent valve-catalyst carrier assembly 100 carries a catalyst material which enhances recombination of hydrogen and oxygen gas produced during the electrolytic reaction within the lead-acid battery. Vent valve-catalyst cover assembly 100 is positioned to provide pressure relief from within battery 10 to atmosphere upon pressure within battery 10 reaching a predetermined level.

Vent valve-catalyst carrier assembly 100 preferably extends into battery 10 via an apertured vent valve-catalyst carrier assembly receptacle 26 formed in battery cover 16. Receptacle 26 preferably includes an integrally molded cylindrical collar 42. Vent valve-catalyst cover assembly 100, when in place within receptacle 26, vents gas from inside battery 10 when pressure exceeds a predetermined level. A catalyst carrying plug 32 is supported at the end of the vent valve-catalyst carrier assembly 100 which is inside battery 10 and promotes recombination of hydrogen and oxygen to minimize water loss from battery 10.

Vent valve-catalyst carrier assembly 100 includes a preferably injection molded body 102 having upper and lower cylindrical portions with the upper portion denoted 104 and being of larger diameter and the lower portion denoted 106 and being of smaller diameter. Upper and lower cylindrical body portions are connected by an annular web 108. Extending across the open interior at the upper end of lower cylindrical body portion 106 is a valve seating web designated generally 110 in which a valve stem member 112 is retained.

Extending downwardly from the cylindrical interior of lower cylindrical body portion 106 is a cage designated generally 114.

Slidably retained within cage 114 is a catalyst carrying plug 32 within which are particles or granules of catalyst material designated C in FIG. E.

Cage 114 includes axially elongated rail members 116 and an annular outer ring portion 118 in which are formed apertures 120, best seen in FIGS. F and H, which receive downwardly extending nibs 122 which are integral with and formed as a part of lower cylindrical body portion 106.

Extremities of rail members 116 at the lower end of cage 114 curve radially inwardly to join one another and form a cross configuration at the bottom of cage 114. These lower extremities of rail members 116 are designated generally 124 in FIG. D and form the cross illustrated in FIG. D.

An annular interior shoulder 132 formed in the inner surface of upper cylindrical body portion 104 proximate the top end thereof is shown in FIG. C and provides a shoulder for support of a porous disk 128 which is preferably formed of porous polyethylene and serves to block flames or sparks from passing through the vent valve portion of the vent valve-catalyst carrier assembly 100. A vent valve-catalyst carrier assembly cover 126 covers the axially facing exterior of upper cylindrical body portion 104 and preferably frictionally couples to upper cylindrical body portion 104 via vent valve cover tabs 130 which are positioned to fit snugly within the cylindrical open interior of upper cylindrical body portion 104 proximate the upper extremity thereof. Vent valve-catalyst carrier assembly cover 126 includes apertures 134 through which gas may pass. Preferably the unitary piece which includes upper cylindrical body portion 104, lower cylindrical body portion 106 and annular web 108 is molded polypropylene.

In FIG. C an O-ring 136 is depicted around the cylindrical exterior of lower cylindrical body portion 106 proximate to juncture of lower cylindrical body portion 106 and annular web 108. O-ring 136 provides a gas-tight seal between vent valve-catalyst cover assembly 100 and body cover 16 when vent valve-catalyst cover assembly 100 is in place.

Formed about the lower annular exterior of lower cylindrical body portion 106 are at least a pair of angularly tapered camming shoulders 138. These camming shoulders 138 taper in an angular direction as illustrated in FIG. D, growing in size in the radial direction with angular travel about the circular outer periphery of lower cylindrical body portion 106. The portions of angularly tapered camming shoulders 138 illustrated in FIG. C are the shoulder portions of maximum radial thickness. As illustrated in FIG. D, these portions taper down with angular position in a counter-clockwise direction in FIG. D, to a position of tangency with the cylindrical outer surface of lower cylindrical body portion 106.

At the position of maximum radial thickness, angularly tapering camming shoulders 138 include radially extending (upwardly in FIG. C, but downwardly in FIG. D) camming blocks 140. Radially extending camming blocks 140 are adapted for camming contact with corresponding opposed camming blocks 142 which are preferably molded in place within a cylindrical passageway formed in battery cover 16 which receives vent valve-catalyst carrier assembly 100. The radially facing (upper in FIG. C, lower in FIG. D) surfaces of radially extending camming blocks 140 are movable camming surfaces 144 cooperating with complementally shaped downwardly facing camming surfaces 146 formed on camming blocks 148 which are preferably molded in place within the cylindrical interior of receptacle 26 in cover 16 within which vent valve-catalyst carrier assembly 100 fits.

As seen in FIG. C, catalyst carrying plug 32 is preferably sealed at one end by epoxy 92. Catalyst carrying plug 32 is gas permeable for the catalyst to aid in recombination of hydrogen and oxygen within battery 10 to ensure battery 10 does not prematurely fail due to water loss.

Cage 114 and catalyst carrying plug 32 are preferably located along a gas flow path within battery 10. Catalyst carrying plug 32 preferably has an axial dimension less than length of cage 114 such that catalyst carrying plug 32 can move axially for free gas flow about catalyst carrying plug 32. The radial dimension of catalyst carrying plug 32 is selected so that plug 32 may slidably contact the rail members of cylindrical cage 114.

Valve openings 200 shown in FIG. E permit gas flow through vent valve-catalyst cover assembly 100.

Valve member 56 illustrated FIG. C is preferably a flexible inverted mushroom-shaped member 56, preferably made of rubber, having a cap 202 and a valve stem 112 extending through valve aperture 86. When valve stem 112 is snugly received in valve aperture 86 in web 110, peripheral edge 202a of valve member 56 covering valve openings 200 rests on valve seating web 110, in sealing contact with web 110 in the valve closed position illustrated in FIG. C. In this position, valve member 56 seals valve openings 200 closed. Valve member 56 is secured in position by engagement of a narrow waist portion 204a beneath aperture 86 in valve seating web 110 as shown in FIG. E which resists upward motion of valve member 56. Downward movement of valve member 56 is precluded by cap 202 which has a radial dimension much greater than valve aperture 86.

If pressure builds within the battery case, gas may pass between rail members 116 and into the open interior 208 of lower generally cylindrical portion 106, to exert force on the underside of mushroom-shaped cap 202 to unseat mushroom-shaped cap 202 from valve seating web 110.

Open interior 208 of lower cylindrical body portion 106 for gas flow therein is shown in FIG. D. The specific actuation properties of the valve to facilitate pressure relief are determined by choice of the rubber utilized to manufacture mushroom-shaped cap 202. For example, a rubber durometer value of yields a differential pop-off pressure of 0.5 to 5.0 psi. As pressure rises above the selected threshold, mushroom-shaped cap 202 unseats, permitting gas flow upwardly through valve openings 200.

FIGS. I and J show a vent valve-catalyst carrier combination 100' employing a different valve construction but embodying broad structural features of the vent valve-catalyst cover assembly 100 shown in FIGS. A through E. Since the structures are similar in many ways, corresponding parts have been given similar number designations with the addition of primes thereto.

In vent valve-catalyst cover assembly 100' illustrated in FIGS. I and J, lower cylindrical body portion 106', which fits into receptacle 26 in cover 16 similarly to body portion 106 shown in FIG. C, has angularly tapered camming shoulders 138'. The upper surfaces of those shoulders provide movable camming surfaces 144' which cooperate with cam surfaces similar to those of angularly tapered camming shoulders 138 in FIG. C on lower cylindrical body portion 106. Upper cylindrical body portion 104' does not serve as part of the vent body. Instead, upper cylindrical body portion sidewall 52' is connected to lower cylindrical body portion 106' by upper cylindrical body portion bottom 58' through which lower cylindrical body portion 106' extends, almost to the top of the upper cylindrical body portion sidewall 52'. Thus an annular groove is formed to receive vent valve cover tabs 130' which are near the edge of vent valve-catalyst carrier assembly cover 126'.

Vent valve-catalyst carrier assembly cover 126' is flush with the top edge of the upper cylindrical body portion sidewall 52' so that not only is gas flow confined within lower cylindrical body portion 106', but a different appearance results. The valve is wholly within the lower cylindrical body portion 106' so that the vent channel is through an integrally molded barrier across the bottom of the lower cylindrical body portion 106'. Again, a porous fire wall is provided by porous disk 128' which rests on annular interior shoulder 132' at the top of lower cylindrical body portion 106'.

The outside profile seen in FIG. I is essentially the same as that of the structure of FIGS. A through E and the insertion into receptacle 26 of battery cover 16 and coupling to the collar (42) is the same as described in connection with FIGS. A through H. Furthermore, the catalyst container may be the same with the same catalyst material sealed therein with epoxy in the same way and supported in the same structure, all as shown in FIGS. F through H.

In FIGS. I and J the valve structure includes an axially oriented cylindrical tubular member 210 preferably molded of the same resinous material as the rest of the valve body to which it is connected by a barrier annular web 212 which extends inward from and lies flush with the bottom of lower cylindrical body portion 106'. At the top of cylindrical tubular member 210 is an integral ring 214 having radial slots 214a therethrough the ring. Covering the cylinder and integral ring 214 is an inverted cup 216 preferably made of rubber, a rubber-like material or some other material having similar elastic resilient properties and good frictional adherence to cylindrical tubular member 210 and integral ring 214 which it surrounds.

Increase of differential pressure inside the battery to a predetermined amount above atmospheric moves the flexible, stretchable sidewalls of inverted cup 216 away from the outside of the cylindrical tubular member 210 and integral ring 214 so that gas may pass through slots 214a, down past the sidewalls of inverted cup 216, up through porous disk 128', and out through apertures 134' of the vent valve-catalyst carrier assembly cover 126'. The durometer range for inverted cup 216 is essentially the same as for valve member 56.

Referring to FIGS. K through N, another embodiment of a vent valve-catalyst carrier assembly suitable for installation in a multi-cell common head space recombinant valve-regulated lead-acid battery practicing the invention is designated generally 100". Vent valve-catalyst carrier assembly 100" includes a preferably injection molded body 102" having upper and lower cylindrical portions, with the upper portion denoted 104" and being of larger diameter and the lower portion denoted 106" and being of smaller diameter. Upper and lower cylindrical body portions are connected by an annular shoulder 108". Extending across the open interior at the upper end of lower cylindrical body portion 106" as an extension of shoulder 108" is a valve seating web designated generally 110".

Extending downwardly from the cylindrical interior of lower cylindrical body portion 106" is a cage designated generally 114".

Slidably retained within cage 114" is a catalyst carrying plug 32 within which is the catalyst material.

Cage 114" includes axially elongated rail members 116" and an annular outer ring portion 118" in which are formed apertures 120", similar to those illustrated in FIGS. F and H, receiving downwardly extending nibs 122" which are integral with and formed as a part of lower cylindrical body portion 106".

Extremities of rail members 116" at the lower end of cage 114" turn radially inwardly to join one another and form a cross configuration at the bottom of cage 114". These lower extremities of rail members 116" are designated generally 124" in FIG. L and form a cross as illustrated in FIG. L.

An annular interior shoulder 132" formed in the inner surface of upper cylindrical body portion 104" proximate the top end thereof is shown in FIG. N and provides a shoulder for support of a porous disk 128" which is preferably formed of porous polyethylene and serves to block flames or sparks from passing through the vent valve portion of the vent valve-catalyst carrier assembly 100". A vent valve-catalyst carrier assembly cover 126" covers the axially facing exterior of upper cylindrical body portion 104", and preferably frictionally couples to upper cylindrical body portion 104" via vent valve cover tabs 130" which fit snugly within cylindrical interior of upper cylindrical body portion 104" proximate the upper extremity thereof. Vent valve-catalyst carrier assembly cover 126" includes apertures 134" through which gas may pass. Preferably the unitary piece which includes upper cylindrical body portion 104", lower cylindrical body portion 106" and annular shoulder 108" is molded polypropylene.

In FIG. N an O-ring 136" is depicted around the cylindrical exterior of lower cylindrical body portion 106" proximate to juncture of lower cylindrical body portion 106" and annular shoulder 108". O-ring 136" provides a gas-tight seal between vent valve-catalyst cover assembly 100" and battery cover 16 when vent valve-catalyst cover assembly 100" is in place.

Formed about the lower annular exterior of lower cylindrical body portion 106" are at least a pair of angularly tapered camming shoulders. These camming shoulders taper in an angular direction growing in size in the radial direction with angular travel about the circular outer periphery of lower cylindrical body portion 106". These shoulders taper with angular position in a counter-clockwise direction to a position of tangency with the cylindrical outer surface of lower cylindrical body portion 106".

At the position of maximum radial thickness, angularly tapering camming shoulders include radially extending camming blocks 140". Radially extending camming blocks 140", are adapted for camming contact with corresponding opposed camming blocks which are preferably molded in place within the cylindrical passageway of receptacle 26 formed in battery cover 16 which receives vent valve-catalyst carrier assembly 100". The radially facing surfaces of radially extending camming blocks 140" are movable camming surfaces 144" which cooperate with complementally shaped downwardly facing camming surfaces formed on the camming blocks which are preferably molded in place within the cylindrical passageway of receptacle 26 in cover 16, within which vent valve-catalyst carrier assembly 100" fits, in the manner described above with respect to camming shoulder 138' and FIGS. C and D.

As seen in FIG. N, catalyst carrying plug 32 is preferably sealed at one end by epoxy. Catalyst carrying plug 32 is gas permeable for the catalyst to aid in recombination of hydrogen and oxygen within battery 10.

Cage 114" and catalyst carrying plug 32 are preferably located along a gas flow path within battery 10. Catalyst carrying plug 32 preferably has an axial dimension less than length of cage 114" such that catalyst carrying plug 32 can move axially and there is free gas flow about catalyst carrying plug 32. The radial dimension of catalyst carrying plug 32 is selected so that plug 32 may slidably contact the rail numbers of cylindrical cage 114".

Valve seating web 110" is molded integrally as an extension of annular shoulder 108". Valve seating web 100' includes at least one pressure relief aperture 316 and at least one vacuum relief aperture 318. Surrounding aperture 316 is an outwardly projecting cylindrical nozzle 360 integrally molded with and supported on seating web 110". Nozzle 360 has lateral vent slots 360a at its edge remote from shoulder 108".

Surrounding aperture 318 is an inwardly projecting cylindrical nozzle 362 integrally molded with seating web 110". Nozzle 362 has lateral vent slots 362a at its inner edge remote from shoulder 108". Slots 360a and 362a give their respective nozzles a castellated appearance. Alternatively, vent holes may be provided through nozzles 360 and 362 near their ends remote from shoulder 108".

Covering nozzle 360 is snugly fitting resilient cup 320, made of rubber or other elastic material, whose side walls snugly engage those of nozzle 360. A cup 366 is similar to cup 320 and is similarly secured to nozzle 362 by frictionally engaging overlying sidewalls.

Operation of nozzle-cup combinations 360, 320 and 362, 366 is dependent upon internal gas pressures which overcome the resilient forces holding the cup sidewalls to the nozzle sidewalls to permit gas to escape or enter at the lip of the cup between the side walls of the cup and the nozzle walls. Upward movement of cup 320, if it would occur at all, is limited to the spacing between nozzle 360 and porous disk 128", which distance is shorter than the length of the cup sidewalls. In addition to functioning as a stop or limiting barrier, porous disk 128" also acts as a fire barrier.

The elastic force of cup 320 on nozzle 360 tends to hold cup 320 in place. As pressure builds within the battery case, the gas exerts a force laterally upon cup 320 sidewalls through vents 360a. After pressure exceeds a predetermined threshold, cup 320 sidewalls unseat from nozzle 360 sidewalls sufficiently to discharge gas from the battery case to atmosphere external of the battery through cup walls 320 up through porous disk 128" and vents 134" in cover 126". Cup 320 is retained in position by sidewall contact friction with the nozzle. Should cup 320 unseat, however, porous disk 128" acting as limiting means will prevent sufficient movement to bring the end of cup 320 sidewalls above vents 360a.

Porous disk 128" is supported on shoulder 132" molded into sidewall of upper cylindrical body portion 104" and held in place by vent valve cover tabs 130" fictionally engaged on the inner wall of upper cylindrical body portion 104".

Operation of cup 366 relative to nozzle 362 is essentially the same but reversed in direction since it is a partial vacuum inside the battery case which causes the action. The higher atmospheric pressure which extends inside upper cylindrical body portion 104" and moves the sidewalls of cup 366 away from nozzle 362. Higher pressure atmospheric air then flows through the space created by deflection of the cup walls to increase pressure within the battery. Should there be a tendency for cup 366 to displace axially from nozzle 362, movement of cup 366 much less than required to move the lip of the cup as far as the nozzle vents 362a will be prevented by porous wall 384. Wall 384 is supported by an integral ring structure carried by rails 116".

Actuation of either cup 320 or 366 to facilitate pressure release is dictated by the properties of the rubber utilized to manufacture the cup and the elastic release force along the nozzle surface. For example, a rubber composition having a durometer value of 50 yields a release pressure of 0.5 to 5.0 p.s.i. As pressure rises above the durometer-controlled threshold, the cup sidewalls unseat, discharging gas between those walls and the walls of its supporting nozzle.

Most desirably the catalyst material and catalyst unit residing in receptacle 26 are maintained within head space 24.

As illustrated in FIG. 1, the lead metal plates 500 of the battery have upstanding tabs for connection purposes, which tabs have not been numbered. Plates of like polarity in adjacent cells may be connected by lead metal straps, such as indicated by 550 in FIG. 1, where the lead metal straps may be welded to the tabs of the plates in an advantageous manufacturing procedure. A significant advantage of the invention is that with common head space, which is identified as 24 in FIG. 1, welding of connection straps 550 to plates 500 of cells and other welding connections which are desirably made in lead-acid batteries to provide good electrical and structural connection, may be made without risk to the usually plastic and therefore easily thermally degraded case. With the common head space battery of the invention, the vapor communication passageways between communicating cells may be made sufficiently large so that connecting straps 550 pass easily therebetween without being in close proximity to plastic portions of the case, thereby reducing the risk of damage to the case during welding operations.

It is within the scope of the invention to have the connection straps 550 pass through internal partitions within the battery case separating cells one from another or to pass above those partitions or to be in contact with those partitions.

While the battery embodying the invention in schematic forms in FIG. 1 has been illustrated with a front terminal access, the invention is not limited to front terminal access batteries. The access terminals may be provided in any position.

The catalyst carrying plug may be a porous ceramic. One suitable ceramic material for catalyst carrying plug 32 is marketed by the General Electric Company under the trademark Raton. Additional suitable materials are metal lattices and other sufficiently porous materials which are inactive or inert with respect to the catalyst and can survive the acidic vapor environment within a lead-acid battery.

The invention embraces the combination of catalysts and cells in any number, so long as the number of communicating cells is greater than the number of communicating catalyst units, i.e. so long as at least one catalyst unit serves more than one vapor-communicating cell or cell compartment. Additionally, multiple catalysts may be used, so long as the number of vapor-communicating cells or cell compartments is greater than the number of catalyst units serving that group of vapor-communicating cells or cell compartments.

The invention further embraces the combination of integral catalyst unit-vent valve combinations and cells in any number where the number of communicating cells may be the same as the number of catalyst unit-vent valve combinations. The position of the catalyst in the common head space is not critical.

EXAMPLE 1

One practice of the invention has involved two (2) 12 volt recombinant lead-acid batteries having six (6) cells each with vertically oriented plates. The plates of these batteries are approximately five inches (5") high, where height is indicated by dimension A in FIG. 1, and are approximately four inches (4") wide, where plate width is indicated by dimension C in FIG. 1. The battery case is approximately six and one-half inches. (6½") high in the inside, as indicated by dimension B in FIG. 1. These batteries have their six (6) cells aligned in the longitudinal direction indicated by Arrow D in FIG. 2, and have vertical partitions separating the six (6) cells.

The six (6) cells are divided into two (2) groups, of three (3) cells each, by a central internal vertically extending partition. The two (2) groups of cells are physically and chemically (but not electrically) isolated from one another; there is no vapor or liquid communication between the two groups of cells. However, there is vapor communication among the three cells of a single group, as explained below.

Individual cells of each of two (2) groups of three (3) adjoining cells share a common head space. The common head space is created by the internal partitions within the battery jar, separating the individual three (3) cells of a group from one another, being notched at the upper extremities of the partitions, in the manner indicated generally in FIG. 2. The notches are of a size convenient for fabrication purposes and are on the order of about one inch (1") in width and one-quarter inch (¼") to one half inch (½") in depth.

There is no aperture or cut-out in the center partition separating the first group of three (3) cells from the second group of three (3) cells. As a result these 12 volt batteries embodying the invention have two (2) head spaces, with each one of the three (3) cells in a respective group of cells sharing one of the two head spaces in common with the remaining two (2) cells of the group.

In this practice of the invention one (1) catalyst unit is provided for each of the two (2) groups of three (3) cells. Each catalyst unit is mounted on the battery cover immediately above one of the notched partitions separating individual ones of the three (3) cells from the remaining two (2) cells of a group. The catalyst units are displaced transversely from the position of the notch in the partition above which the catalyst unit is mounted. In this practice of the invention the catalyst units do not include vent valves in combination therewith.

These two (2) catalyst-equipped vapor-communicating six-cell recombinant lead-acid 12 volt batteries embodying the invention have been tested and found to compare very favorably with commercially available 12 volt batteries sold under the designation LS12-25 by C & D Technologies, Inc. Commercially available C & D Technologies LS12-25 batteries are rated as being capable of supplying a constant current of 4.8 amps over a five (5) hour period without cell voltage falling below 1.75 volts.

Formation of water, through recombination of hydrogen and oxygen, is desirable to maintain desired conditions within the battery.

A test determined gassing characteristics of these two batteries embodying the invention vis-a-vis the LS12-25 batteries which are commercially available from C & D Technologies, Inc. Gassing is a measure of hydrogen and oxygen gas which escapes from the battery and hence is not available to form water in a recombination reaction within the battery. Oxygen adversely reacts with the negative grid and limits battery discharge capacity. Hence, gassing is undesirable in a battery.

In testing, the catalyst-equipped vapor-communicating multi-cell lead-acid recombinant 12 volt batteries embodying the invention and the commercially available C & D Technologies LS12-25 batteries used for comparison purposes were initially maintained at a voltage of 2.26 volts per cell by application of a small current, of sufficient magnitude to overcome the tendency of the cells to self-discharge. This is commonly referred to as maintaining the batteries "on float". While "on float", the batteries were tested for gassing at the 2.26 volts/cell float voltage.

The batteries were then measured to determine how they performed with respect to the rated five (5) hour current discharge capacity of the LS12-25 batteries, from a starting voltage of 2.26 volts per cell. These measurements were performed by drawing a constant current from each battery until the battery voltage fell to 1.75 volts.

After discharge, each of the batteries was recharged to a voltage of 2.26 volts per cell and then further charged to a voltage of 2.35 volts per cell. Each battery was then measured for gassing at the 2.35 volts per cell level. After being measured for gassing, each of the batteries was further charged to 2.45 volts per cell and again measured for gassing.

Table I presents the test results. The gassing data are presented in cubic centimeters of measured gas per hour for each battery.

TABLE I

|  | Invention 12 Volt Batteries | | Commercially Available 12 Volt LS12-25 Batteries | |
| --- | --- | --- | --- | --- |
|  | #1 | #2 | #1 | #2 |
| 2.26 v-gassing | 0.04 | 0 | 0.85 | 0.32 |
| 2.35 v-gassing | 0 | 0 | 9.1 | 11.4 |
| 2.45 v-gassing | 0 | 0 | 47.1 | 54.6 |
| % 5 hr. cap. to 1.75 v | >117.6% | 109% | 110.3% | 115.6% |

Surprisingly, one catalyst-equipped vapor-communicating multi-cell recombinant 12 volt lead-acid battery embodying the invention evolved only four one-hundredths (0.04) of a cubic centimeter of measurable gas per hour while being floated at 2.26 volts per cell. The same battery evolved no measurable gas at 2.35 volts per cell nor at 2.45 volts per cell, as illustrated in Table I, even though there was only a single catalyst unit for each group of three cells. Even though two cells (of each group of three) had to depend on mass transfer among the cells via the common head space for vapor communication with the catalyst, gassing of the battery as a whole was negligible and not even measurable (if there was any gassing at all) at the two higher cell voltages.

Also surprisingly, as evident from Table I, a second catalyst-equipped vapor-communicating multi-cell 12 volt lead-acid recombinant battery embodying the invention did not evolve any measurable amount of gas while being floated at 2.26 volts per cell, nor while maintained at 2.35 volts per cell and 2.45 volts per cell, even though there was only a single catalyst unit for each group of three cells. Even though two cells of each group of three had to depend on mass transfer among the cells via the common head space for vapor communication with the catalyst, gassing of the battery was not measurable.

As further evident from Table I, both of these catalyst-equipped vapor-communicating multi-cell 12 volt lead-acid batteries embodying the invention exceeded the rated five (5) hour discharge capacity of the comparable commercially available C & D Technologies LS12-25 batteries.

Other than presence of the catalyst units and provision of common head spaces for each group of three (3) cells, the catalyst-equipped vapor-communicating multi-cell 12 volt lead-acid recombinant batteries embodying the invention, for which the test data is set forth in Table I, were identical to commercially available C & D Technologies LS12-25 lead-acid batteries.

As apparent from Table I, the commercially available C & D Technologies LS12-25 lead-acid batteries evidenced much greater gassing than the catalyst-equipped vapor-communicating multi-cell 12 volt lead-acid recombinant batteries embodying the invention. Specifically, the lowest rate of gassing by one of the LS12-25 batteries was eight (8) times that of the only measurable gassing of one of the catalyst-equipped vapor-communicating multi-cell 12 volt lead-acid recombinant batteries embodying the invention.

EXAMPLE 2

Another practice of the invention has involved two 12 volt recombinant lead-acid batteries having six (6) cells each. The plates of these batteries are approximately seven inches (7") high, where height is indicated by dimension A in FIG. 1, and are approximately five inches (5") wide, where plate width is indicated by dimension C in FIG. 1. The battery case is approximately eight inches (8") high in the inside, as indicated by dimension B in FIG. 1. These batteries have their six (6) cells oriented in two (2) groups of three (3) cells each, where the two groups of cells are adjacent one to another, and the three cells of each group are aligned in the longitudinal direction indicated by Arrow D in FIG. 2. Vertical partitions separate the six (6) cells. There is vapor communication among cells of a single group, as explained below.

The six (6) cells are divided into two (2) groups of three (3) cells each by a central internal vertically extending partition. The two (2) groups of cells are physically and chemically (but not electrically) isolated from one another; there is no vapor or liquid communication between the two groups of cells. There is vapor communication among the three (3) cells of a single group.

Individual cells of each of two (2) groups of three (3) longitudinally adjoining cells share a common head space. The two common head spaces are created by the transverse vertically extending partitions within the battery jar, separating the individual three (3) longitudinally aligned cells of a group from one another, being notched at the upper extremities of the partitions in the manner indicated generally in FIG. 2. The notches are of a size convenient for fabrication purposes and are on the order of about one inch (1") in width and one-quarter inch (¼") to one half inch (½") in depth.

There is no notch, aperture or cut-out in the center partition separating the first group of three (3) cells from the second group of three (3) cells. As a result these 12 volt batteries embodying the invention have two (2) head spaces, with each one of the three (3) cells in a respective group of cells sharing one of the two head spaces in common with the remaining two (2) cells of the group, with both of the head spaces being parallel with one another and extending the longitudinal length of the battery case.

One (1) catalyst unit is provided for each of the two (2) groups of three (3) cells. Each catalyst unit is mounted on the battery cover above the central cell of a group, at approximately the longitudinal and transverse midpoint of the cell. In this practice of the invention the catalyst units did not include vent valves in combination therewith.

These two (2) catalyst-equipped vapor-communicating six-cell recombinant lead-acid 12 volt batteries embodying the invention have been found by testing to compare very favorably with commercially available 12 volt batteries sold under the designation FA12-125 by C & D Technologies, Inc. Commercially available C & D Technologies FA12-125 batteries are rated as being capable of supplying a specified constant current of 24.0 amps over a five (5) hour period without cell voltage falling below 1.75 volts.

In testing, the catalyst-equipped vapor-communicating multi-cell lead-acid recombinant 12 volt batteries embodying the invention and the commercially available C & D Technologies FA12-125 batteries used for comparison purposes were initially maintained at a voltage of 2.26 volts per cell by application of a small current to maintain the batteries "on float", as explained above. While "on float", each of the batteries was measured for gassing at the 2.26 volts/cell float voltage.

The batteries were then further charged to a voltage of 2.35 volts per-cell. Each battery was then measured for gassing at the 2.35 volts per cell level. The batteries were then further charged to 2.45 volts per cell and again measured for gassing.

Table II presents the test results. The gassing data are presented in cubic centimeters of measured evolved gas per hour for each battery.

TABLE II

Data Presented as Gassing Rate in CC/HR/CELL

| Battery # | 2.26 VPC | | 2.35 VPC | | 2.45 VPC | |
|---|---|---|---|---|---|---|
| | 1 | 2 | 1 | 2 | 1 | 2 |
| Invention Battery | 0 | 0 | 0.62 | 0 | 1.2 | 0 |
| Commercial Available FA12-125 Battery | 0.93 | 1.4 | 16.8 | 7.8 | — | — |

Surprisingly, neither of the catalyst-equipped vapor-communicating multi-cell recombinant 12 volt lead-acid batteries embodying the invention produced any measurable gas while being floated at 2.26 volts per cell. One of these batteries embodying the invention similarly produced no measurable hydrogen gas at 2.35 and at 2.45 volts per cell, as set forth in Table II, even though there was only a single catalyst unit for each group of three cells. Even though in these batteries embodying the invention two cells of each group of three had to depend on mass transfer among the cells via the common head space for vapor communication with the catalyst, gassing for one of these batteries embodying the invention was negligible and indeed not even measurable (if there was any gassing at all) across the entire range of cell voltages.

Also surprisingly, as evident from Table II, a second one of the catalyst-equipped vapor-communicating multi-cell 12 volt lead-acid recombinant batteries embodying the invention did not evolve any measurable amount of hydrogen gas while floated at 2.26 volts per cell. That battery lost just 0.62 cubic centimeters of gas per hour while at 2.35 volts per cell and only 1.22 cubic centimeters of gas per hour at 2.45 volts per cell, even though there was only a single catalyst unit for each group of three cells. Even though two cells of each group of three had to depend on mass transfer among the cells via the common head space for vapor communication with the catalyst, gassing of the battery as a whole was so low as to be insignificant.

Other than presence of the catalyst units and provision of common head spaces for each group of three (3) cells, the catalyst-equipped vapor-communicating multi-cell 12 volt lead-acid recombinant batteries embodying the invention, for which the test data is set forth in Table II, were identical to commercially available C & D Technologies FA12-125 lead-acid batteries.

As apparent from Table II, the commercially available C & D Technologies FA12-125 lead-acid batteries evidenced much greater gassing than the catalyst-equipped vapor-communicating multi-cell 12 volt lead-acid recombinant batteries embodying the invention. Specifically, in three of the four conditions under which gassing could be measured and compared, while there was no measurable gassing of the catalyst-equipped vapor-communicating multi-cell 12 volt lead-acid recombinant battery embodying the invention, there was significant gassing in the commercially available FA12-125 batteries. In the single instance where both a battery embodying the invention and a commercially available FA12-125 battery produced measurable gassing, the commercially available FA12-125 batteries gassed at a rate at least an order of magnitude greater than the battery embodying the invention. The lowest rate of gassing by one of the FA12-125 lead-acid batteries was an order of magnitude greater than that of the only measurable gassing of one of these two catalyst-equipped vapor-communicating multi-cell 12 volt lead-acid recombinant batteries embodying the invention.

EXAMPLE 3

Yet another practice has involved two (2) 6 volt recombinant lead-acid batteries having three (3) cells each. The plates of these batteries are approximately seven inches (7") high, where height is indicated by dimension A in FIG. 1, and are approximately six inches (6") wide, where plate width is indicated by dimension C in FIG. 1. The battery case is approximately eight (8") high in the inside, as indicated by dimension B in FIG. 1. These batteries have their three (3) cells aligned in the longitudinal direction. Comparable commercially available C & D Technologies LS6-200 batteries are rated as being capable of supplying a specified constant current of 38.4 amps over a five (5) hour period without cell voltage falling below 1.75 volts.

The three (3) cells are physically and chemically (but not electrically) isolated from one another; there is no liquid communication between the three groups of cells, but there is vapor communication among the three (3) cells.

The three (3) groups of two adjacent cells all share a common head space. The common head space is created by the upper extremities of the internal partitions within the battery jar, which separate the adjacent cells from each other, stopping short of the battery cover. In these batteries embodying the invention there are no notches, such as those illustrated generally in FIG. 2 in the vertically extending partitions.

Three (3) catalyst units are provided for each of the batteries, located in the common head space shared by the three (3) cells. The catalyst units are mounted on the battery cover immediately above the internal partitions which divide the battery interior into compartments. The catalyst units are displaced transversely from the walls of the battery case.

These two (2) catalyst-equipped vapor-communicating three-cell recombinant lead-acid 6 volt batteries have been tested for weight loss, which occurs as a result of gassing, with very favorable results.

In testing, these two catalyst-equipped vapor-communicating multi-cell lead-acid recombinant 6 volt batteries were maintained at a voltage of 2.26 volts per cell by application of a small current, of sufficient magnitude to overcome the tendency of the cells to self-discharge, referred to as maintaining the batteries "on float". While "on float", each of the batteries was measured for weight loss.

While "on float" the batteries were also periodically tested to determine how they performed with respect to the rated five (5) hour current discharge capacity of comparable C &

D Technologies LS6-200 batteries, from a starting voltage of 2.26 volts per cell. These measurements were performed by withdrawing a constant current from each battery until the cell voltage in the battery fell to 1.75 volts.

After each such discharge measurement, each of the batteries was recharged to a level of 2.26 volts per cell and returned to the float condition. During the entire test time, both batteries were maintained in an environment at a 120° F. temperature, for 131 days. This is believed to be equivalent to about 800 days of service at 77° F.

Other than presence of the catalyst units, the catalyst-equipped vapor-communicating multi-cell 6 volt lead-acid recombinant batteries embodying the invention, for which the test data is set forth in Table III, were identical to commercially available C & D Technologies LS6-200 lead-acid batteries.

Table III presents the test results.

TABLE III

| Days @ Temp. | Battery A | Battery B |
|---|---|---|
| 0 | 111.9% | 115.0% |
| 50-Percent Rated Capacity | 118.1% | 117.3% |
| 50 Weight Loss, grams | 0 grams | 6 grams |
| 100-Percent Rated Capacity | 117.1 | 115.2 |
| 100 Weight Loss, grams | 60 | 52 (Total of 58) |
| 131-Percent Rated Capacity | 114.7 | 117.5 |

Remarkably, after fifty days in the 120° F. temperature environment, one of these batteries had not lost any weight (indicating there was no gassing), whereas the second of these batteries had lost only six grams of weight. Further remarkably, after fifty days in the 120° F. environment, both batteries actually exhibited increases in discharge current capacity. One of the batteries exhibited discharge current capacity 111.9% that of the rated discharge current capacity of a comparable LS6-200 battery when the test began, while the second battery exhibited discharge current capacity 115% that of the rated discharge current capacity for a comparable C & D Technologies LS6-200 battery when the test began.

Even more remarkably, after 100 days in the 120° F. test environment, both of the batteries still exhibited increases in discharge current capacity over and above those exhibited when the test began. The discharge current capacity of battery A dropped only by one percentage point (1%) between day 50 and day 100 and still remained over seventeen percentage points (17%) in excess of the rated discharge current capacity of a comparable commercially available LS6-200 battery when the test began.

After 100 days battery B experienced a drop in discharge current capacity back nearly to the level of discharge current capacity it had exhibited when the test began; both batteries remained well above the rated discharge current capacity for the comparable commercially available battery.

Further remarkably, after 100 days in the 120° F. environment, battery A had lost only sixty grams of weight; all sixty grams were lost between the 50th and 100th day in the 120° F. environment. Battery B lost fifty-two grams of weight between day 50 and day 100 meaning that at day 100, battery B lost a total of fifty-eight grams of weight relative to what battery B had weighed at the beginning of the test.

Further remarkably, after 131 days in the 120° F. test environment, both battery A and battery B had discharge current capacities above that exhibited at the beginning of the test and well above the rated current discharge capacity for a comparable commercially available battery. Indeed, in the case of battery B, the discharge current capacity actually increased between day 100 and day 131 in the 120° F. test environment.

What is claimed is:

1. A recombinant lead-acid battery comprising:
   a. a case;
   b. a plurality of lead-acid cells within said case, each cell comprising:
      i. a plurality of positive and negative lead metal plates;
      ii. electrolytes between at least some of said positive and negative plates;
   c. said case including apertured partitions separating adjacent cells one from another and defining space for vapor migration among cells; and
   d. at least one catalyst unit having catalyst material therein connected to said case and communicating with said vapor migration space for enhancing recombination of hydrogen and oxygen, wherein said at least one catalyst unit is not directly thermally-conductively coupled to said electrolytes.

2. The battery of claim 1 wherein said catalyst unit is at least partially within said case.

3. The battery of claim 1 wherein said catalyst unit is within said case.

4. The battery of claim 1 wherein said catalyst is palladium.

5. A recombinant lead-acid battery comprising:
   a. a case comprising a jar and a cover;
   b. a plurality of lead-acid cells within said jar, each cell comprising:
      i. a plurality of upstanding positive and negative lead metal plates;
      ii. electrolytes between at least some of said positive and negative plates;
   C. said jar including upstanding partitions for separating adjacent cells one from another;
   d. upper portions of said partitions being spaced from said cover to define space for vapor migration among cells;
   e. at least one catalyst unit connected to said case and communicating with said vapor migration space for enhancing recombination of hydrogen and oxygen, wherein said at least one catalyst unit is not directly thermally-conductively coupled to said electrolytes.

6. The battery of claim 5 wherein a plurality of said catalyst units is provided, said catalyst units are of number less than said plurality of cells.

7. The battery of claim 5 wherein plates of a given polarity of respective cells have upstanding terminal tab portions extending above said upper portions of said partitions, and further comprising:
   a. electrically conductive members connectingly extending between said terminal tab portions of plates of like polarity of adjacent cells.

8. The battery of claim 7 wherein said electrically conductive members are lead metal strips and are welded to respective terminal tab portions.

9. A recombinant lead-acid battery comprising:
   a. a case comprising a jar and a cover;
   b. a plurality of lead-acid cells within said jar, each cell comprising:
      i. a plurality of upstanding positive and negative lead metal plates;
      ii. electrolytes between at least some of said positive and negative plates;

c. said jar including upstanding partition portions for separating adjacent cells one from another;
d. said cover including downwardly extending partition portions aligned with said upstanding partition portions to define partitions which together with walls of said case form case compartments for said cells;
e. said partitions having apertures therethrough for vapor communication among cells in respective case compartments;
f. upper portions of said plates being spaced from said cover to define space for vapor residence;
g. at least one catalyst unit connected to said case and communicating with said vapor residence space for enhancing recombination of hydrogen and oxygen, wherein said at least one catalyst unit is not directly thermally-conductively coupled to said electrolytes.

10. The battery of claim 9 wherein a plurality of said catalyst units is provided, said catalyst units are of number less than said plurality of cells.

11. A recombinant lead-acid battery comprising:
a. a case comprising ajar and a cover;
b. a plurality of lead-acid cells within said jar, each cell comprising:
  i. a plurality of upstanding positive and negative lead metal plates;
  ii. electrolytes between at least some of said positive and negative plates;
c. said jar including upstanding partitions for separating adjacent cells one from another;
d. upper portions of said partitions being spaced from said cover to define space for vapor migration among cells;
e. at least one combination catalyst unit-vent valve removably connected to said case and communicating with said vapor migration space for enhancing recombination of hydrogen and oxygen and for permitting gas escape from said battery interior upon internal pressure reaching a predetermined level above atmospheric, wherein said at least one catalyst unit-vent valve is not directly thermally-conductively coupled to said electrolytes.

12. A recombinant lead-acid battery comprising:
a. a case comprising ajar and a cover;
b. a plurality of lead-acid cells within said jar, each cell comprising:
  i. a plurality of upstanding positive and negative lead metal plates;
  ii. electrolytes between at least some of said positive and negative plates;
c. said jar including upstanding partitions for separating adjacent cells one from another;
d. said cover including downwardly extending partition portions aligned with said upstanding partition portions to define partitions which together with walls of said case form case compartments for said cells;
e. said partitions having apertures therethrough for vapor communication among cells in respective case compartments;
f. upper portions of said plates being spaced from said cover to define space for vapor residence;
e. at least one combination catalyst unit-vent valve removably connected to said case and communicating with said vapor residence space for enhancing recombination of hydrogen and oxygen and for relieving battery internal pressure, wherein said at least one combination catalyst unit-vent valve is not directly thermally-conductively coupled to said electrolytes.

13. A recombinant lead-acid battery comprising:
a. a case comprising ajar and a cover;
b. a plurality of lead-acid cells within said jar, each cell comprising:
  i. a plurality of upstanding positive and negative lead metal plates;
  ii. electrolytes between at least some of said positive and negative plates;
c. said jar including upstanding partitions for separating adjacent cells one from another;
d. upper portions of said partitions being spaced from said cover to define space for vapor migration among cells;
e. at least one catalyst unit connected to said case and communicating with said vapor migration space for enhancing recombination of hydrogen and oxygen, said at least one catalyst unit being of number less than said plurality of said cells.

14. The battery of claim 13 wherein plates of a given polarity of respective cells have upstanding terminal tab portions extending above said upper portions of said partitions, and further comprising:
a. electrically conductive members connectingly extending between said terminal tab portions of plates of like polarity of adjacent cells.

15. The battery of claim 14 wherein said electrically conductive members are lead metal strips and are welded to respective terminal tab portions.

16. A recombinant lead-acid battery comprising:
a. a case comprising ajar and a cover;
b. a plurality of lead-acid cells within said jar, each cell comprising:
  i. a plurality of upstanding positive and negative lead metal plates;
  ii. electrolytes between at least some of said positive and negative plates;
c. said jar including upstanding partition portions for separating adjacent cells one from another;
d. said cover including downwardly extending partition portions aligned with said upstanding partition portions to define partitions which together with walls of said case form case compartments for said cells;
e. said partitions having apertures therethrough for vapor communication among cells in respective case compartments;
f. upper portions of said plates being spaced from said cover to define space for vapor residence;
g. at least one catalyst unit connected to said case and communicating with said vapor residence space for enhancing recombination of hydrogen and oxygen, said at least one catalyst unit being of number less than said plurality of cells.

* * * * *

UNITED STATES PATENT AND TRADEMARK OFFICE
CERTIFICATE OF CORRECTION

PATENT NO.    : 6,524,747 B2
DATED         : February 25, 2003
INVENTOR(S)   : Holden et al.

It is certified that error appears in the above-identified patent and that said Letters Patent is hereby corrected as shown below:

Title page,
Item [74], delete "...Hoffman..." and insert -- Hoffmann --.

Column 11,
Line 34, delete "...value of yields..." and insert -- value of 50 yields --.

Column 13,
Line 65, delete "seating web 100'..." and insert -- seating web 100" --.

Signed and Sealed this

Fourteenth Day of October, 2003

JAMES E. ROGAN
*Director of the United States Patent and Trademark Office*